United States Patent
Wynne et al.

(10) Patent No.: US 11,110,650 B1
(45) Date of Patent: Sep. 7, 2021

(54) VAT-BASED ADDITIVE MANUFACTURING WITH DISPENSED MATERIAL

(71) Applicant: Intrepid Automation, San Diego, CA (US)

(72) Inventors: Ben Wynne, Escondido, CA (US); Shirley Lee, Poway, CA (US); Jamie Lynn Etcheson, San Diego, CA (US); Christopher Sean Tanner, Idyllwild, CA (US); Robert Lee Mueller, San Diego, CA (US); Ivan Dejesus Chousal, Chula Vista, CA (US); James Pingel, San Diego, CA (US)

(73) Assignee: Intrepid Automation, San Diego, CA (US)

( * ) Notice: Subject to any disclaimer, the term of this patent is extended or adjusted under 35 U.S.C. 154(b) by 0 days.

(21) Appl. No.: 17/247,115

(22) Filed: Nov. 30, 2020

Related U.S. Application Data

(60) Provisional application No. 63/086,829, filed on Oct. 2, 2020.

(51) Int. Cl.
*B29C 64/135* (2017.01)
*B33Y 10/00* (2015.01)
(Continued)

(52) U.S. Cl.
CPC .......... *B29C 64/135* (2017.08); *B29C 64/209* (2017.08); *B29C 64/245* (2017.08);
(Continued)

(58) Field of Classification Search
CPC ... B29C 64/135; B29C 64/209; B29C 64/245; C08K 7/02; B33Y 70/00; B33Y 10/00; B29K 2033/04
See application file for complete search history.

(56) References Cited

U.S. PATENT DOCUMENTS 9,708,442 B1 * 7/2017 Kwisnek ................. G03F 7/038
10,316,213 B1 6/2019 Arndt et al.
(Continued)

FOREIGN PATENT DOCUMENTS

WO 2013128452 A1 9/2013
WO 2020065655 A1 4/2020

OTHER PUBLICATIONS

3D Printing Solutions, HP, Accessed Online on Aug. 31, 2020, 5 pages, https://www8.hp.com/us/en/printers/3d-printers/products/multi-jet-technology.html.
(Continued)

*Primary Examiner* — Nahida Sultana
(74) *Attorney, Agent, or Firm* — MLO, a professional corp.

(57) ABSTRACT

Methods of creating additive manufactured parts include providing a first composition in a vat, where the first composition is a liquid with a first viscosity. A build platform is placed adjacent to and submerged under a top surface of the first composition. A second composition is dispensed on the top surface, the second composition having a second viscosity and being dispensed in a shape area according to a part to be created. The top surface is illuminated to expose the first composition and second composition to light having a polymerization wavelength, thereby causing polymerization of at least one of the first composition or second composition. In some embodiments, the first composition is a base resin that is absent of a photoinitiator, and the second composition is a photoinitiator solution. The photoinitiator solution may have a second viscosity that is less than the first viscosity of the base resin.

22 Claims, 17 Drawing Sheets

(51) Int. Cl.
*B33Y 70/00* (2020.01)
*B29C 64/245* (2017.01)
*C08K 7/02* (2006.01)
*B29C 64/209* (2017.01)
*B29K 33/04* (2006.01)

(52) U.S. Cl.
CPC .............. *B33Y 10/00* (2014.12); *B33Y 70/00* (2014.12); *C08K 7/02* (2013.01); *B29K 2033/04* (2013.01)

(56) References Cited

U.S. PATENT DOCUMENTS

| | | | |
|---|---|---|---|
| 2010/0244301 A1* | 9/2010 | Ederer | B05C 3/005 264/45.6 |
| 2017/0282450 A1 | 10/2017 | Slep et al. | |
| 2018/0272604 A1* | 9/2018 | Welch | B29C 64/214 |
| 2018/0272606 A1* | 9/2018 | Chang | B29C 64/295 |
| 2018/0304526 A1* | 10/2018 | Feller | B29C 64/379 |
| 2018/0333911 A1* | 11/2018 | Lin | B29C 64/218 |
| 2018/0333914 A1 | 11/2018 | Rudisill et al. | |
| 2018/0370123 A1* | 12/2018 | Abell | B33Y 80/00 |
| 2019/0054689 A1 | 2/2019 | Rudisill et al. | |
| 2019/0092951 A1* | 3/2019 | Wang | B29C 64/124 |
| 2019/0240730 A1* | 8/2019 | Haider | B28B 17/0081 |
| 2019/0374309 A1* | 12/2019 | Parkar | A61K 6/887 |
| 2020/0140614 A1* | 5/2020 | Parkar | B29C 64/393 |

OTHER PUBLICATIONS

Doubrovski et al., Voxel-based fabrication through material property mapping: A design method for bitmap printing, Computer-Aided Design, vol. 60, Mar. 2015, pp. 3-13.
PolyJet Technology, Stratasys, Access Online on Aug. 31, 2020, 6 pages, https://www.stratasys.com/polyjet-technology#imageCarousel.

* cited by examiner thiol   "ene" double bond → addition product

VAT-BASED ADDITIVE MANUFACTURING WITH DISPENSED MATERIAL

RELATED APPLICATIONS

This application claims priority to U.S. Provisional Application No. 63/086,829, filed on Oct. 2, 2020 and entitled "Vat-Based Additive Manufacturing with Dispensed Material"; the contents of which are hereby incorporated by reference in full.

BACKGROUND

Additive manufacturing (i.e., 3D printing) has become an extremely popular method for producing parts, from prototypes to commercial production. There are many types of additive manufacturing systems and methods that have been developed. Some types utilize a vat containing a photosensitive polymer (i.e., photopolymer), where layers of the 3D printed part are grown upon each other within the vat. The photopolymer cross-links and hardens upon exposure to photopolymerization wavelengths of light, changing the liquid resin into a solid polymeric material. These photoreactive 3D printing systems typically include a resin pool, an illumination system, and a print platform, where the illumination system projects an image into the resin pool causing a layer of a polymeric object to be formed on the print platform. The print platform then moves the printed layer out of the focal plane of the illumination system, and then the next layer is exposed (i.e., printed). Some systems use a "top-down" approach where the light exposes an upper surface of the resin, and then the print platform moves down into the vat so that the next layer can be built. Other systems are "bottom-up" where the light is projected through a transparent bottom surface of the resin pool, and then the print platform moves up, away from the bottom surface, as the part continues to be formed.

Stereolithography (SLA) 3D printing employs a point laser or lasers that move around a 2D plane in a rasterized manner to create a pattern layer in the resin. Other conventional systems use digital light processing (DLP) or similar imaging in order to expose an entire layer at once with improved speed. However, one problem that arises with conventional additive manufacturing systems utilizing DLP is that as the layer size increases, the pixel size increases proportionally. The result is a decrease in the resolution of the final part, which will negatively affect part accuracy and surface finish. This also has the negative effect of reducing the projected energy density, which slows down the print process further as each layer needs a longer exposure time. Therefore, as DLP systems are used for larger layer sizes, the theoretical advantage that full layer exposing achieves over other methods is reduced.

Other types of additive manufacturing create a printed part in an open-air environment rather than in a vat. In one example, polymers are inkjet-printed onto a substrate and then exposed to radiation such as ultraviolet (UV) light to initiate photopolymerization. The polymers may be two different compounds that are capable of polymerizing when mixed together. In another example, a bed of powdered material is supplied on a substrate, and a fusing agent is dispensed by inkjetting at locations where the material is desired to be fused together. The material bed is exposed to energy such as light or heat, causing the material to fuse together where the agent is present.

SUMMARY

In some embodiments, a method of creating additive manufactured parts includes providing a first composition in a vat, where the first composition is a liquid with a first viscosity. A build platform is placed in the vat, submerged under a top surface of the first composition. A second composition is dispensed on the top surface of the first composition, the second composition having a second viscosity and being dispensed in a shape area according to a part to be created. The top surface is illuminated to expose the first composition and the second composition to light having a polymerization wavelength, thereby causing polymerization of at least one of the first composition or the second composition.

In some embodiments, a method of creating additive manufactured parts includes providing a base resin in a vat, where the base resin has a first viscosity and is absent of a photoinitiator. A build platform is placed in the vat, submerged under a top surface of the base resin. A photoinitiator solution is dispensed on the top surface of the base resin, the photoinitiator solution being dispensed in a shape area according to a part to be created. The photoinitiator solution has a second viscosity that is less than the first viscosity of the base resin. The top surface is illuminated to expose the photoinitiator solution and the base resin to light having a polymerization wavelength, where the light causes polymerization only where the photoinitiator solution was dispensed.

DETAILED DESCRIPTION

Figure 1:
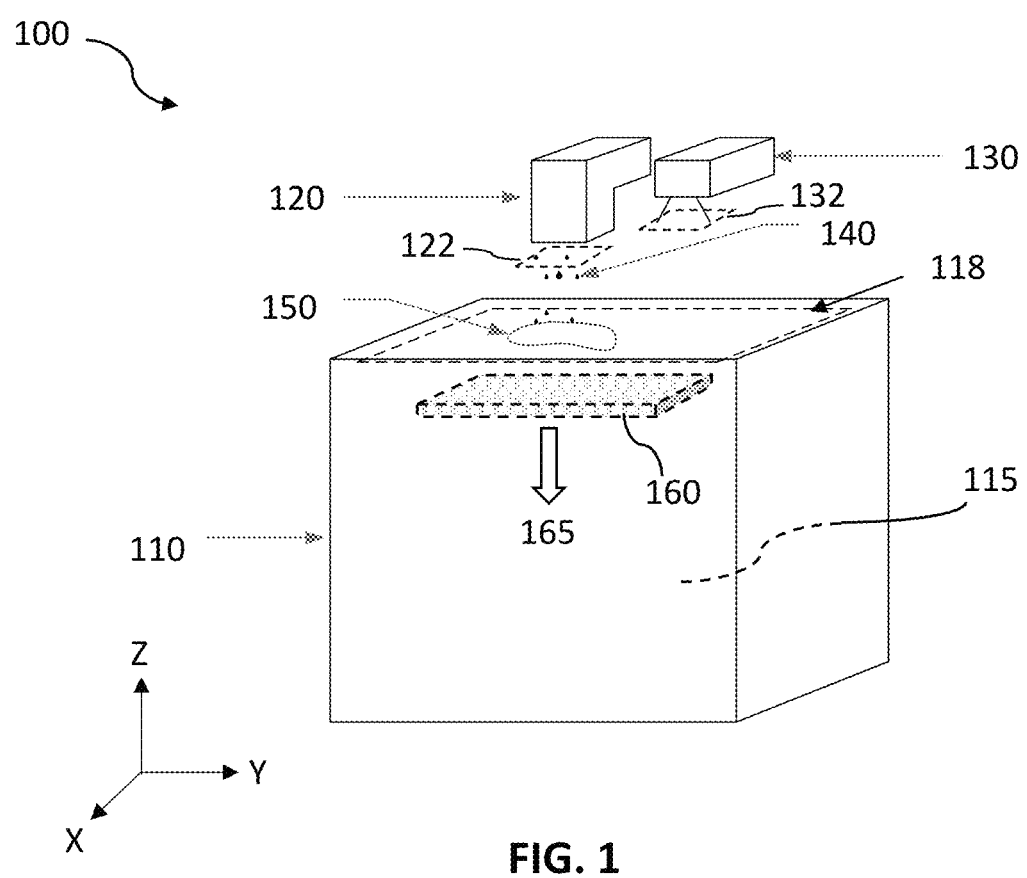
FIG. 1 is a diagram of an additive manufacturing system, in accordance with some embodiments.

The present disclosure describes vat-based additive manufacturing techniques in which certain materials are selectively dispensed onto the top surface of a liquid substance in the vat. The vat is a tank or tub that is used to hold liquid. Embodiments provide on-demand delivery systems for dispensing materials such that reactants/components come into contact with each other in the vat to form additive manufactured parts. In some embodiments, a substance is dispensed on the surface of a photopolymerizable content that is in the vat, selectively promoting polymerization only in the areas where the substance is delivered. In some embodiments, the dispensed substance may be a reaction activator such as a photoinitiator solution that is precisely added into the vat material, and the vat material does not include a photoinitiator. After being dispensed in the vat, the photoinitiator absorbs a polymerization actuation energy such as ultraviolet (UV) light, such that the material is cured only where the photoinitiator is present. In some embodiments, a first reactant of a chemical reaction can be used as the vat material and a second reactant that will react with the first reactant for polymerization (e.g., in the presence of UV light) can be dispensed, such as thiols and/or -enes. The term "-enes" refers to chemical compounds containing an ene functional group. In some embodiments, the vat material need not contain polymerizable content. For example, the vat material can be an inert medium such as water, glycerin, or gel with desired physical/chemical properties, and polymerizable components are dispensed onto the inert medium (e.g., liquid, gel or other fluid-like substance) in the vat.

Embodiments of the present disclosure provide advantages for additive manufacturing such as improving the ability to scale up 3D printed part sizes while achieving high resolution quality. Embodiments of the present disclosure also provide an advantage of improving the shelf-life of vat materials. For example, keeping the photoinitiator separate from the other resin ingredients increases the shelf-life of the resin ingredients and provides the ability to easily store the non-photoinitiator materials in areas containing light. In other examples, embodiments provide the ability to deliver and mix chemically labile components at the desired moment to circumvent shelf-life issues, such as in thiol-ene material systems. Conventional vat-based systems that offer larger build areas for scaled-up part sizes, in contrast, present problems for controlling and managing vat life. Unusable resin results in high scrap costs, such as tens or hundreds of thousands of dollars if the resin in a vat is compromised.

Conventional vat-based 3D printing solutions, especially those involving DLP or projection-based systems, also tend to have thermal issues involving unintended over-cure in hot areas, resulting in print defects. Thermal issues are typically a result of non-uniformities of the UV light source (e.g., hot spots) and cross-sectional area density of the geometry being printed. Higher cross-sectional area density causes hot spots due to the exothermic reactions from the polymerization process. To address the thermal issues, conventional methods usually slow down printing processes by either reducing the UV light source intensity or adding additional delays throughout the print process. Slowing down the print process reduces productivity and increases cost. Embodiments of the present disclosure address thermal issues in a different manner, by precisely varying and/or controlling the amount, concentration, and/or type of a dispensed substance (e.g., photoinitiator or other component) as needed.

Figure 2:
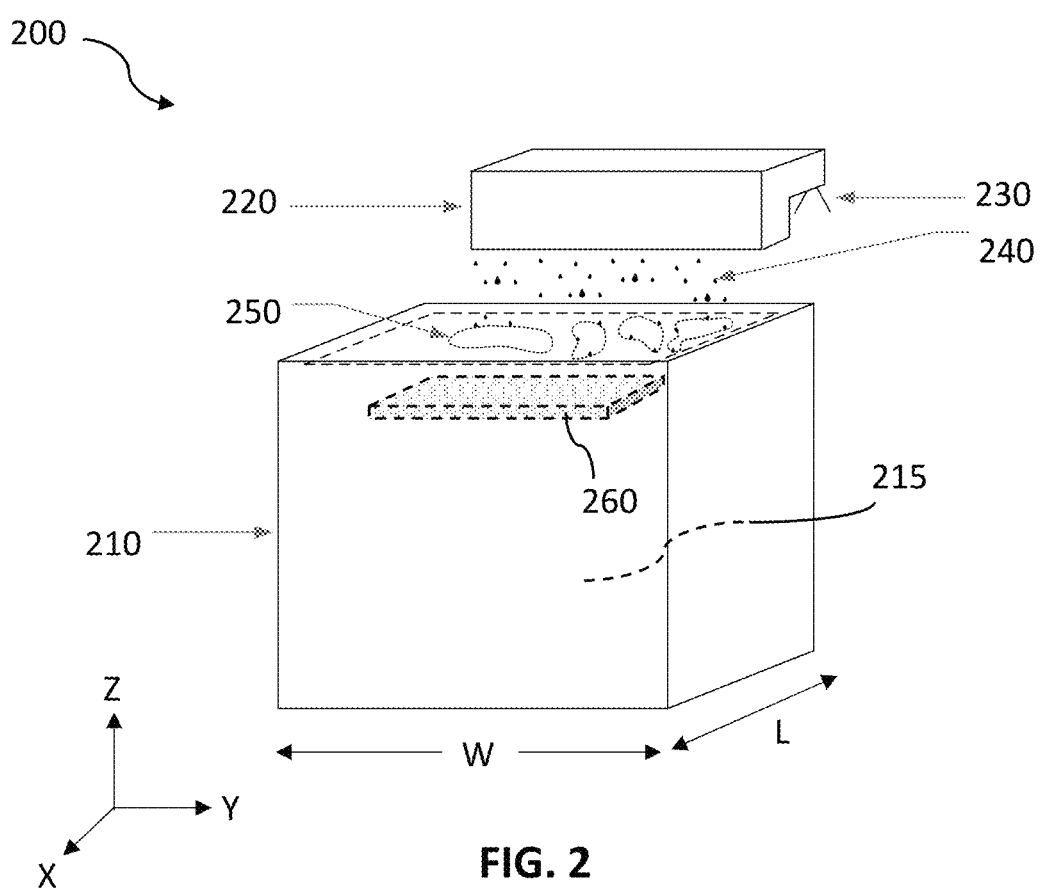
FIG. 2 is a diagram of an additive manufacturing system having a page-wide illumination source, in accordance with some embodiments.
Figure 3:
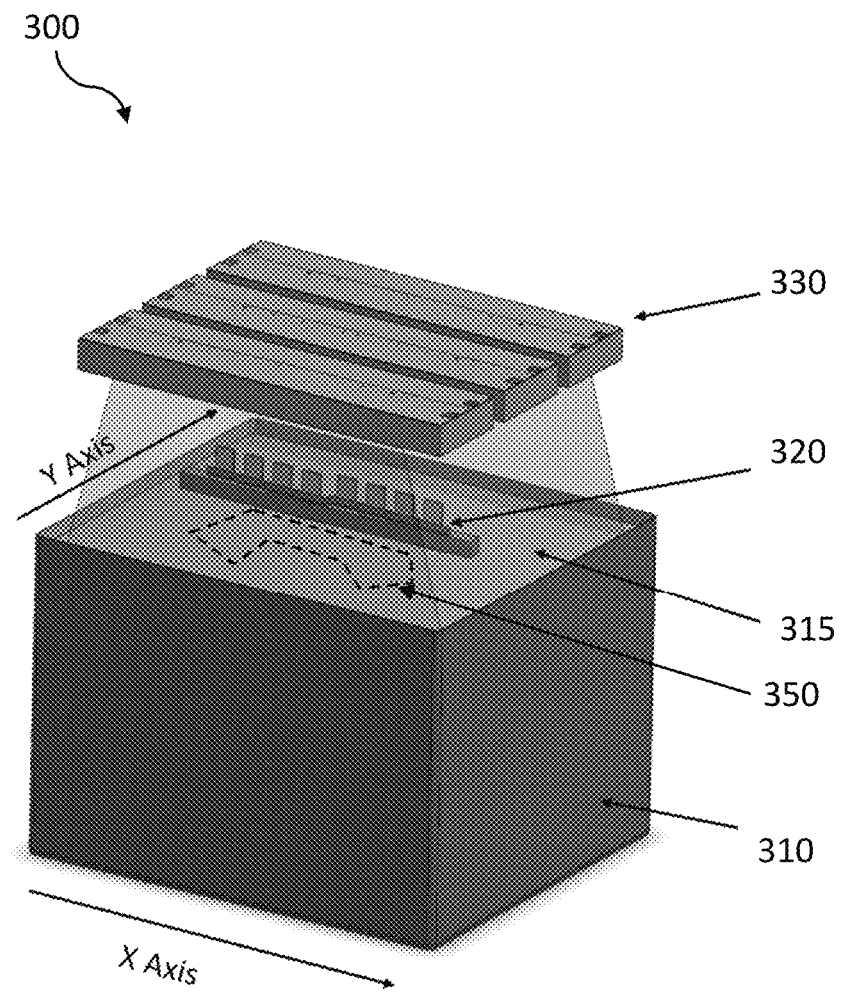
FIG. 3 is a diagram of an additive manufacturing system having a blanket exposure illumination source, in accordance with some embodiments.

FIGS. 1-3 show isometric views of additive manufacturing systems, in accordance with some embodiments. The systems combine a vat-based format with dispensing of additional materials onto the vat material that fills the vat. Various embodiments of vat materials and dispensed materials shall be described in relation to FIGS. 1-3, where a vat material contained in the vat shall also be referred to as a first composition. A dispensing system such as a jetting head used in inkjet printing dispenses a material onto the vat material, where the dispensed material shall be referred to as a second composition. In this disclosure the materials in the vat and being dispensed may also be referred to as compositions, substances, reactants, and components. Also, the dispensing of material will primarily be described in terms of inkjet dispensing (jetting). However, other types of dispensing techniques are also applicable.

Conventional photoreactive resins are made of monomer, oligomer, photoinitiator, and other materials, where a key ingredient that makes the resin polymerize and sensitive to light is the photoinitiator. In some embodiments of FIG. 1, a first composition 115 held in a vat 110 is a resin base material (which may also be referred to in this disclosure as a base resin), where the resin base material is absent of a photoinitiator. That is, the base resin is a composition of substances that will be polymerized into a hardened part but lacking a component that would allow the polymerization to occur. A dispensing head 120 (e.g., inkjet printing head, syringe/pump-type or other) precisely dispenses photoinitiator in liquid form as a second composition 140 onto a top surface 118 of resin base material in the vat 110. Although this embodiment shall be described as dispensing only photoinitiator, embodiments may include dispensing more than one material from the dispensing head 120 (or from more than one dispensing head), as shall be described throughout this disclosure. Furthermore, although FIGS. 1-3 shall primarily be described in terms of dispensing a photoinitiator solution onto a vat material that is absent of a photoinitiator, FIGS. 1-3 may apply to any of the combinations of dispensed materials and vat materials described throughout this disclosure.

In the embodiment of FIG. 1, the dispensing head 120 has a dispensing area 122 that covers only a portion of a width (Y-direction) and a portion of a length (X-direction) of the top surface 118. Consequently, the dispensing head 120 may dispense the photoinitiator over the entire top surface 118 by moving in, for example, a raster pattern (e.g., moving the head side to side in the X-direction to form lines, progressing from top to bottom in the Y-direction). The shape 150 formed by where the photoinitiator droplets were dispensed is the pattern area of a layer of the additive manufacturing part being printed. The additive manufacturing part is formed on a build platform 160 which is submerged in the vat 110. The build platform 160 is adjacent to and underneath the top surface of the resin base when the initial layer of a part is being made, and moves down (negative Z-direction) into the first composition 115 as subsequent layers are continued to be formed. For clarity, the components illustrated in figures throughout this specification may not necessarily be drawn to scale. For example, in FIG. 1 the distance between the platform 160 to the top surface 118 and the distance between the dispensing head 120 from the top surface 118 are larger than what actually may be used.

The resin material and dispensed photoinitiator are then exposed to a wavelength of light from an illumination source 130, which causes polymerization in selective areas constrained to where the photoinitiator is present. The polymerized layer adheres to the build platform 160 as in known vat-based processes. The illumination source 130 may be a UV light source or any other source that produces curing wavelengths that are reactive with the photoinitiator and base resin. For example, in some embodiments, the resin may be photosensitive to wavelengths of illumination from about 200 nm to about 500 nm, or to wavelengths outside of that range (e.g., greater than 500 nm, or from 500 nm to 1000 nm). In the embodiment shown in FIG. 1, the illumination source 130 emits light having an area 132 at least similar in size to or greater than the size of the dispensing area 122 of the dispensing head 120. The illumination source 130 may emit light in a pass subsequent to the jetting head, where the illumination source 130 is moved by a mechanism separate from a mechanism that moves the dispensing head 120. Alternatively, the illumination source 130 may be moved simultaneously with the dispensing head 120, such as by having the illumination source 130 attached to the same movement mechanism as the dispensing head 120.

FIG. 2 is an isometric view of another additive manufacturing system 200 which utilizes a "page-wide" array approach, where a dispensing head spans a width "W" of the vat (or at least as wide as the build platform) and moves across a length "L" of the vat to expose the resin to radiation on a single pass. The system 200 includes similar components as system 100—a vat 210 filled with a first composition 215 (e.g., a resin base material without photoinitiator), a dispensing head 220 (e.g., a jetting head), a light source 230 (e.g., UV light source), and a build platform 260 that is submerged under a top surface of the resin base. The build platform 260 is adjacent to the top surface of the resin base when the initial layer of a part is being made. The dispensing head 220 begins at one end of the vat and moves across the length (X-direction). Because the dispensing head 220 spans the entire width W of the vat 210 at once, dispensing second composition 240 in selected areas according to the print pattern, only one pass across the vat length L is needed. Photoinitator droplets of second composition 240 are present in an area of shape 250 after the pass is completed. The dispensing head 220 may have multiple dispensers (e.g., nozzles) to cover the width of the jetting head, such as in the form of a linear, staggered or offset array (e.g., see FIGS. 9A-9C). In this embodiment of FIG. 2, the UV light source 230 is also a page-wide array that is incorporated into the same mechanism as the jetting head 220, allowing the dispensing (e.g., jetting) and the curing to be performed in the same pass to form a polymerized layer of the printed part. In other embodiments, the light source 230 and dispensing head 220 may be decoupled from each other, such that the light source 230 passes over the vat 210 separately from and after the dispensing head 220.

FIG. 3 shows another embodiment in which the illumination source is configured to illuminate an area as large as the entire top surface area of the vat, to expose the entire top surface of the first composition (e.g., resin) to light at one time (e.g., a blanket exposure). System 300 includes similar components as system 100—a vat 310 filled with a first composition 315 (e.g., a resin base material without photoinitiator), a dispensing head 320 (e.g., a jetting dispenser), and a light source 330 (e.g., UV). A build platform that is submerged under a top surface of the resin base is not shown in this illustration. The dispensing head 320 is shown as a page-wide array in this embodiment similar to dispensing head 220 of FIG. 2. However, dispensing head 320 may also be configured similar to dispensing head 120 of FIG. 1 that dispenses material only in a discrete area. The light source 330 of FIG. 3 is stationary, covering approximately the entire top surface of the vat 310, or at least an area as large as the build platform. In this embodiment, the dispensing head 320 first moves along the Y-axis. After the dispensing head 320 has completed its full pass, depositing the second composition (e.g., photoinitiator) in the shape 350, the light source 330 is activated to cure the first composition and/or second composition in the vat 310.

In further embodiments, more than one type of light source may be utilized, where one light source (e.g., light source 130 or 230) moves with the dispensing head and the other is stationary (e.g., light source 330). The multiple light sources can be activated at different times from each other, such as one light source being activated before, during or after the activation of another light source. Further configurations of dispensing heads and light sources are described in FIGS. 10A-10H.

Figure 4A:
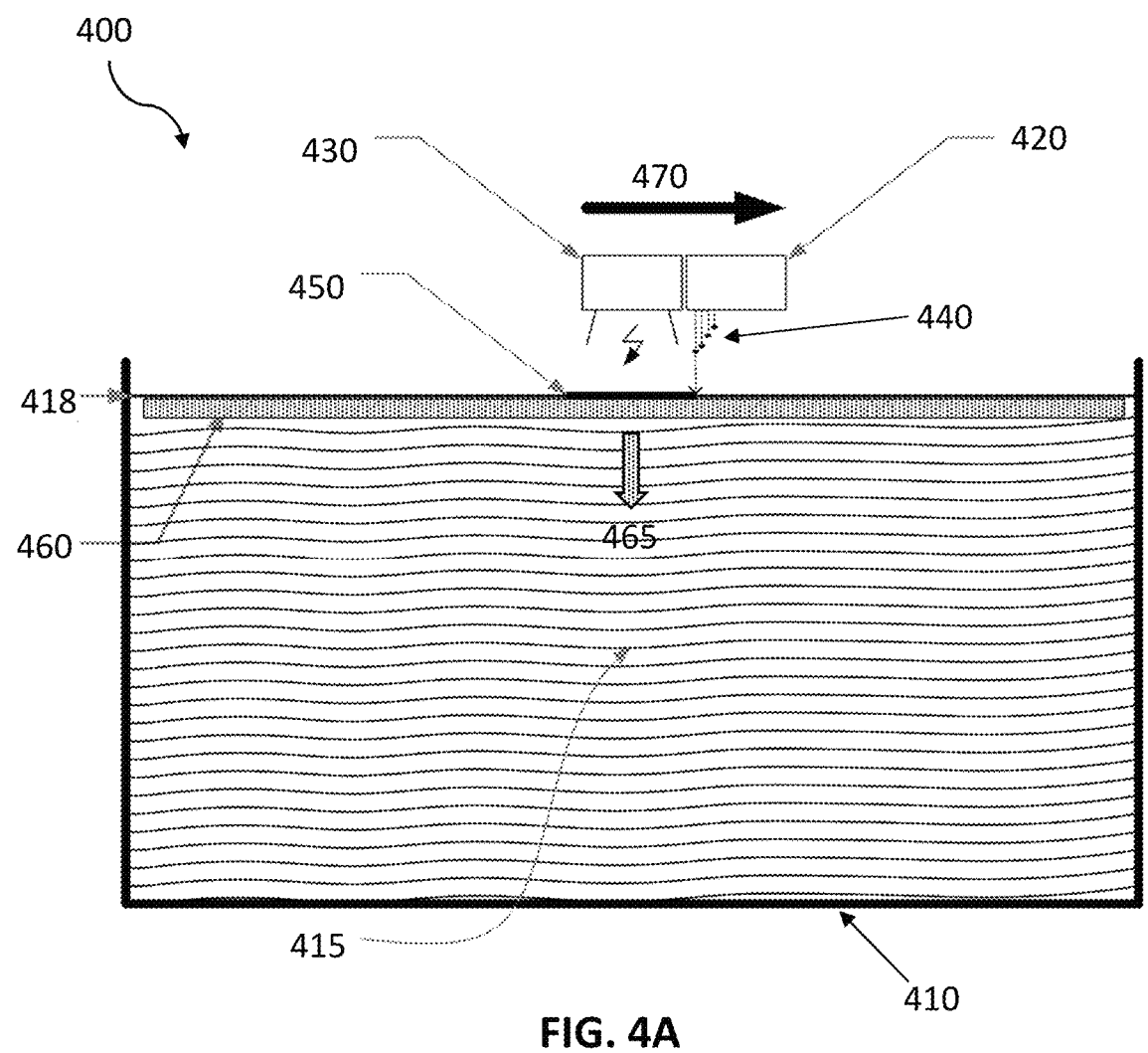
FIGS. 4A-4B show stages of forming an additively manufactured part, in accordance with some embodiments.
Figure 4B:
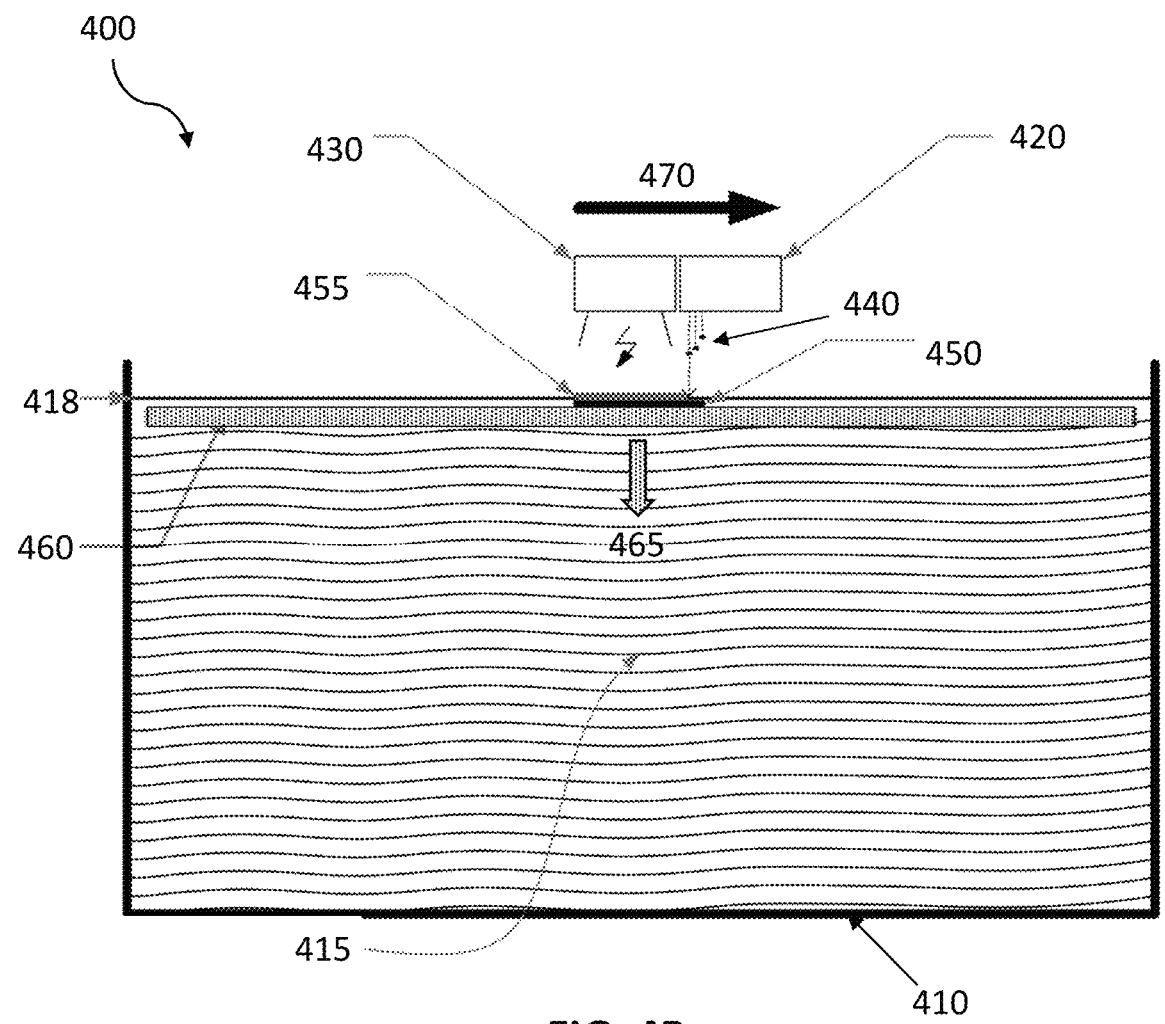

FIGS. 4A-4B show a progression of forming layers of an additively manufactured part, in accordance with some embodiments. In these side cross-sectional views of an additive manufacturing system 400, a vat 410 is filled with a first composition 415 (e.g., a resin base material without photoinitiator). A dispensing head 420 and a light source 430 are positioned over a top surface 418 of the first composition 415, moving together in a print direction indicated by arrow 470. Dispensing head 420 and light source 430 may take the form of any embodiments disclosed herein, such as raster, page-wide or blanket coverage. The dispensing of the second composition 440 and activation of light source 430 may be performed approximately simultaneously (immediately after the second composition is dispensed) or sequentially (having a delay time from when the dispensing occurs and when the light source is activated at the dispensed location). Activation of the light source "immediately" after dispensing can be considered in this disclosure to account for the time for the dispensed material to travel to the surface of the vat material that is a particular distance away from the dispensing head. For example, in some embodiments the dispensing head and top surface of the vat material may be 1 mm to 3 mm apart and the dispensed material may have a jetting velocity of about 5 m/s to 20 m/s. The travel time for the dispensed material to reach the vat material in these scenarios may range from approximately 0.05 ms (1 mm distance at 20 m/s) to 0.6 ms (3 mm at 5 m/s), such as approximately 0.16 ms (2 mm at 12.5 m/s). Thus, "immediately" or "simultaneously" may be considered as activating a light source less than a millisecond (e.g., on the order of microseconds) after the dispensing is initiated. In some embodiments a specifically designed delay time (elapsed time) between the dispensing and the curing (activating the light source) may be used, where the delay time may range from, for example, microseconds to milliseconds, or milliseconds to seconds, or milliseconds to minutes, or microseconds to hours depending on the chemistry of the reactants being used.

FIG. 4A depicts formation of an initial layer 450 of an additive manufactured part, where build platform 460 is positioned adjacent to and just underneath the top surface 418. For example, an upper surface of build platform 460 can be from 0 to 1000 μm below the surface 418 during the formation of the initial layer. The dispensing head 420 deposits second composition 440 (e.g., photoinitiator) in a shape according to the first layer 450 of the part being created. Light energy is absorbed in the pattern areas where the photoinitiator is present with the resin base material, forming a cured first layer 450 having the shape of where the photoinitiator was deposited. The resin-based ingredients of the resin base material combined with the photoinitiator ultimately yield a photoreactive resin shape at the precise locations where the photoinitiator was deposited/jetted. After the initial layer 450 is formed on the build platform 460, the build platform 460 is moved down into the vat material (first composition 415) as indicated by arrow 465.

The dispensing and light-exposing steps are then repeated to create another layer of the part.

FIG. 4B shows the build platform 460 in a more submerged position than in FIG. 4A to enable another layer 455 to be jetted and cured onto the already-formed first layer 450. The distance that the build platform 460 is moved and settled on corresponds to the thickness of the part layers being created. In embodiments, the build platform 460 may first move down farther than the distance of a layer thickness, such as to mitigate bubbles or to allow vat material to be replenished for the next dispensing iteration, and then move back up to settle in its desired position. After the layer 455 is cured, the steps of moving the build platform 460 down further, dispensing the second composition, and curing the first and/or second compositions are repeated until the entire additive manufactured part has been completed.

Embodiments disclosed herein, and particularly the dispensing head array and light source array embodiments of FIGS. 2-3, enable a 3D print job to be performed at extremely fast rates and at much higher resolutions than traditional projection-based or SLA-based approaches. For example, embodiments can provide print rates up to 100 times faster than these traditional approaches, with resolutions comparable to 2D inkjet printer resolutions (e.g., 2400 dpi (dots-per-inch) or more). In some embodiments, multi-pass dispensing can extrapolate beyond such ranges.

Another advantage of the systems and methods of the present disclosure is enabling a 3D print build area to be increased in size while achieving high resolution and without compromising build speed. By taking the photoinitiator out of the resin material, a vat-based resin material is created that is very stable. Such resin base materials can be exposed to light and not cure, thereby improving shelf life and easing the ability to store the resin base material.

Methods for precisely dispensing the photoinitiator or other substances may include technologies used to deposit ink on paper in the 2D printing space. Examples include thermal inkjet-based technology and piezo-based jetting technology. Conventionally, inkjet and piezo-based jetting technologies are not capable of jetting highly viscous or high solid content materials that are used in additive manufacturing. However, embodiments of the present disclosure adapt these jetting technologies for dispensing certain jettable components of additive manufacturing materials such as photoinitiator solutions or other compounds that have low enough viscosities that enable desired print speeds and print resolution to be achieved. Embodiments may also utilize other types of delivery systems for dispensing material onto a liquid substance in a vat, such as using syringe-type pumps to dispense droplets.

The photoinitiator (or other substance for the second composition) is jetted at inkjet resolutions in the shape pattern (i.e., resolutions in the X-Y plane per the coordinate axes annotated in FIG. 1) of each layer of the desired printed part, and then a light source (UV or other appropriate wavelength) exposes the layer to illumination which selectively cures the locations where the photoinitiator was precisely deposited. Placing the photoinitiator at the surface of the resin material in the vat very precisely enables materials that conventionally have very high cure-through to be printed accurately. Cure-through is the amount of unintended curing that takes place in the next layer (Z-direction per the coordinate axes annotated in FIG. 1) beyond the current layer being printed. By precisely controlling/depositing the photoinitiator (or other reactant) on top of the surface as in some embodiments, the depth of cure is limited to the current layer being addressed. For example, inkjet drop sizes are on the order of 1 picoliter (pL) to 2 pL, such as 1.2 pL to 1.5 pL, which are estimated in this disclosure to be spherical drops of approximately 1.5 µm in diameter. These very small drop sizes result in extremely thin layers which translate into high resolution printed parts. Due to the reduction or lack of Z-compensation required in embodiments of the present disclosure, parts can be printed with high accuracy both in X, Y and Z dimensions. Another advantage presented by the present methods is that since the resin is polymerized from the top surface of the vat, the resin base material does not need to transmit light as much as in other vat-based systems, thereby widening choices of curing wavelengths and photoinitiators that may be used.

In some embodiments, the resin base material in the vat can be high in viscosity (e.g., gel or honey-type viscosity) compared to the jetted photoinitiator (or other dispensed material as shall be described in more detail below). This difference in viscosity may assist in achieving high resolution of the printed part due to the viscosity of the resin base material deterring the lower-viscosity dispensed material from spreading on the surface of the resin base material (in the X-Y direction). In some embodiments, the surface energy of the photoinitiator and the resin base material, and the interfacial energy between the photoinitiator and the resin base material can prevent (or limit) the photoinitiator from spreading out after it is deposited, thereby substantially maintaining the resolution of the printed pattern. In addition, photoinitiator droplets will not penetrate (diffuse) very deep into the resin base material, thus also providing high resolution in the Z-direction since the resin will polymerize only to a thickness where the photoinitiator has diffused into the base resin.

Examples of photoinitiators that may be used in embodiments are bis(cyclopentadienyl) bis[2,6-difluoro-3-(1-pyrryl)phenyl] titanium (CAS® Registry number 125051-32-3); 2,4-diethyl-9H-thioxanthen-9-one (CAS #82799-44-8); and diphenyl(2,4,6-trimethylbenzoyl) phosphine oxide (CAS #75980-60-8). Examples of solvents for the photoinitiators, to dispense the photoinitiators as a liquid solution, include ethyl acetate, butyl acetate, isopropanol, 2-pyrrolidinone, and 1-methyl-2-pyrrolidinone. In some embodiments, the dispensed material (e.g., photoinitiator solution) can have a viscosity of about 0.1 centipoise (cP) to about 2 cP. For example, the viscosity of a photoinitiator dissolved in ethyl acetate is about 0.42 cP. In some embodiments, the resin base material can have a viscosity of about 100 cP to about 2700 cP, or more than 2700 cP. Accordingly, in some embodiments a difference in viscosity between the vat material (e.g., base resin) and the dispensed material can be at least 10 cP, such as more than 100 cP or more than 1000 cP or more than 2000 cP.

In addition to the viscosity of the drops, print resolution can also be affected by reaction kinetics which can be controlled by the drop size and drop velocity of the dispensed material. This applies to any combination of substances being used as the first composition and second composition, not only to photoinitiator/base resin systems. For example, drop size affects the amount of substance that is involved in the reaction, and dispensing velocity affects the size of the dispersion area that the droplet will create. Dispersion is a function of viscosity, velocity, and mass of the droplet, as these aspects affect momentum energy. Thus, dispensed drop size and dispensed drop velocity are two additional variables that can be used to adjust reaction kinetics and consequently control print resolution. Furthermore, the diffusion rate and reaction rate of the droplet's reactant (e.g., photoinitiator or other substance as shall be described below) with the vat material can also be controlled by the chemistry of the reactant (e solubility, chemical affinity, etc.).

The size of a voxel (grid volume element of a 3D printed part, equivalent to a pixel in 2D printing) in embodiments of the present disclosure is related to many factors such as the relative viscosity between materials in the volume, size of the dispensed droplets, diffusion/partition/chemical affinity of the ingredients in the droplet, wetting/surface energy of the dispensed material and vat material, time elapsed between the subsequent drop addition (e.g., if multiple components are being dispensed onto the resin in the vat), time elapsed between the droplet deposition and the application of UV radiation, and the characteristics of the UV radiation. In the present vat-based/dispensing systems, reactions are dependent upon mixing of all reactants. The dispensed substance(s) may be deposited simultaneously or sequentially, and reaction variables for controlling the resolution and other properties of the printed part include: (1) physics and/or chemistry of the droplet and the material in the vat, in which viscosity, chemical affinity, and solubility are variables in diffusion of components from one place to another; (2) the manner of how the droplets are deposited, where variables can include drop size, drop velocity, dispensing sequences, and time between each drop sequence; (3) the manner of how the reactions are triggered, such as sensitivity of the photoinitiator to the UV wavelength and intensity, and sequence of how the UV light is used (wavelengths, intensity, sequence+time duration of the application). Factors related to controlling both the dispensing (jetting) and curing (e.g., UV light exposure)—such as specifying the dispensing time, the dwell time to allow dispensing components to mix with components in the vat, and the curing light source behavior all work together to achieve the desired properties of the 3D printed part.

In some embodiments, a dispensing and curing timetable can be utilized to control the additive manufacturing system. In an example in which photoinitiator is dispensed, since curing can only occur when the photoinitiator is present and activated by UV light, dispensing of individual resin components can be on a timetable designed for the desired physical properties and structures. As an illustrative example of a timetable in which time units can be microseconds, milliseconds, seconds, or other: component A may be dispensed at time=0.0, component B dispensed at time=2.1, component C dispensed at time=5.5, and photoinitiator dispensed at time=7.6. This programmed timing between components A-C and the photoinitiator may be designed for specific chemical dwell/diffusion times between components. Continuing with this illustrative example, UV light may be flashed at time=9.9 to 15 to polymerize the components and underlying vat material. Then component D may be dispensed at time=15.1 and UV light flashed at time=17.0, such that component D is polymerized into the layer as well.

Figure 5A:
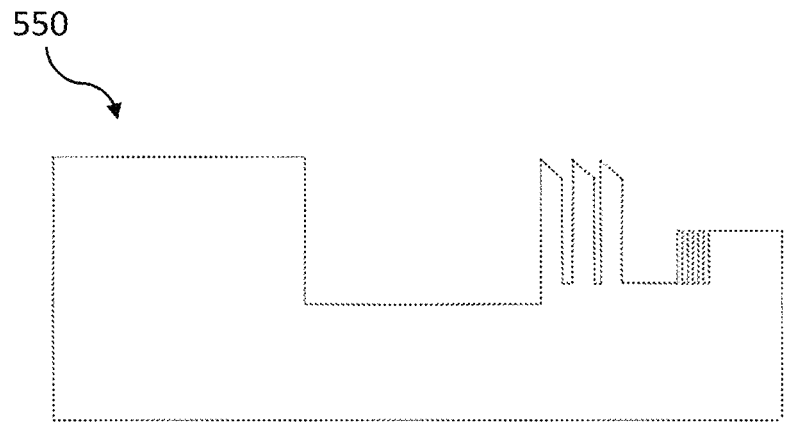
FIG. 5A is an outline of a desired shape for a layer of an additively manufactured part.
Figure 5B:
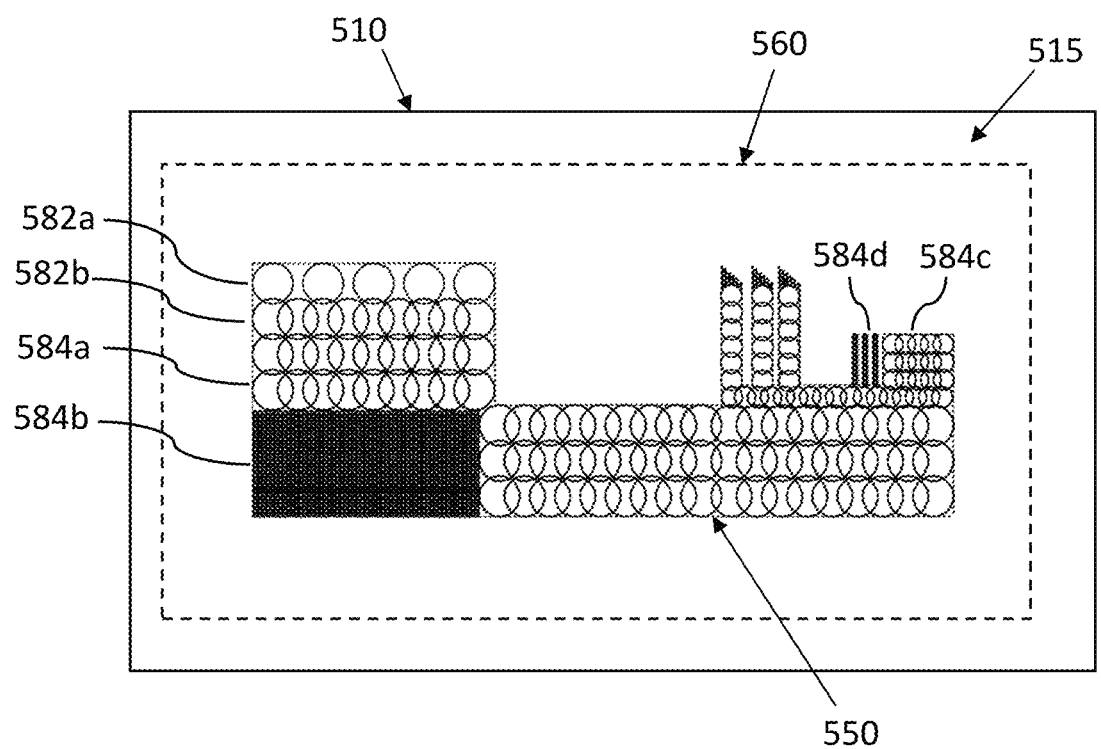
FIG. 5B is a diagram illustrating variations of a dispensed material in the shape, in accordance with some embodiments.

FIGS. 5A-5B illustrate another advantage of the present embodiments, which is the ability to change the amount (e.g., different size drops, or different number of drops) and type of dispensed material (second composition) that is deposited (e.g., jetted) onto different areas of a layer to address issues such as thermal effects. In conventional projection/LCD-based 3D print systems, printing is intentionally slowed down to deal with thermal issues at a layer perspective. Slower printing negatively affects throughput and increases costs. In some embodiments of the present disclosure, the amount of second composition can be adjusted in specific areas, such as applying less photoinitiator in hotter regions to keep temperatures (e.g., as monitored by real-time measurements) normalized across the vat, thus mitigating the need to slow down print rates. This contrasts to conventional resins in which the amount or concentration of photoinitiator is homogenous, being very constant throughout the resin in the vat.

FIG. 5A is a plan view of a desired layer shape 550, such as shapes 150 and 250 of FIGS. 1-2. FIG. 5B is a plan view of the second composition dispensed in the desired shape onto the first composition 515 in a vat 510. An outline of build platform 560 within the vat 510 is also shown. Regions 582a (upper row) and 582b (second row) illustrate different concentrations of the same drop size within the layer shape 550, where in region 582a there are fewer drops (represented by circles) than in region 582b (more drops in an equivalent space), resulting in a higher concentration of the second composition in region 582b. Regions 584a-d illustrate different concentrations and different drop sizes within the layer shape 550. For example, in region 584b (bottom left dark rectangle) the drop sizes are smaller and much more numerous than in region 584a (row just above region 584b). In region 584c (upper right area) the drop sizes are larger than in region 584b but smaller than in region 584a, and the density of drops per area is also in between that of regions 584a and 584b. Region 584d (adjacent to the left side of region 584c) has a drop size and a density of drops per area that is different yet from regions 584a-c. These variations in drop size and concentrations show how print properties can be tailored within a layer of an additively manufactured part by the dispensing process.

In further embodiments, thermal issues can be mitigated using techniques in conjunction with or instead of controlling dispensing parameters. For example, real-time thermal measurements of the top surface of the vat material can be employed to determine print delays and Z-axis moves/distances to allow resin to cool. Z-axis moves can be beneficial in high print density areas, since high print density areas can result in high local temperatures. These motions in the Z-direction can be referred to as "dip" moves and are greater in magnitude than a layer move (which moves a distance of the layer thickness). That is, a dip move can move a distance beyond the thickness of a layer in order to allow the previously exposed layer to cool.

Figure 6:
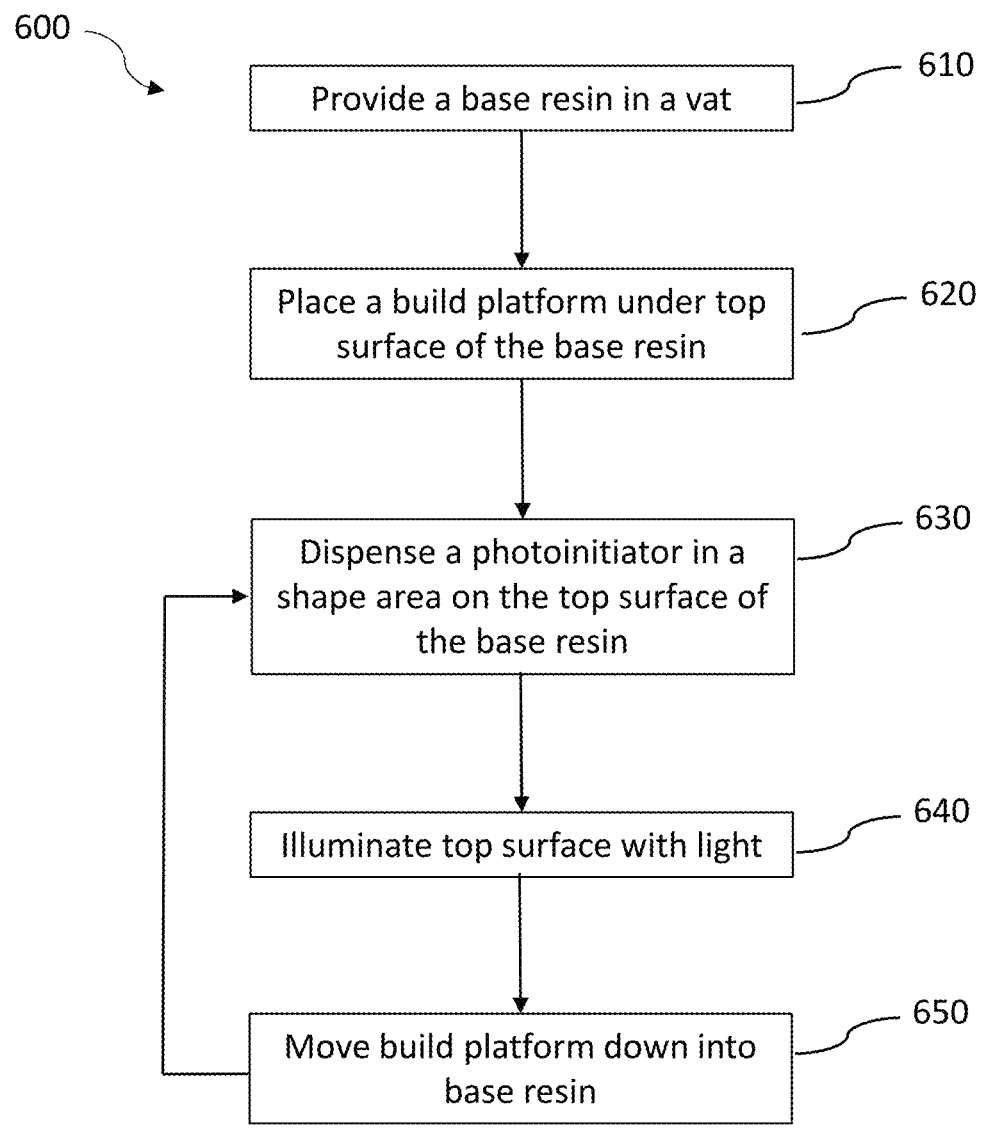
FIG. 6 is a flowchart of additive manufacturing methods, in accordance with some embodiments.

FIG. 6 is a flowchart 600 representing methods of the present disclosure for creating additive manufactured parts, in which a photoinitiator solution is dispensed onto material in a vat. Step 610 involves providing a base resin in a vat, where the base resin has a first viscosity and is absent of a photoinitiator. In step 620, a build platform is placed in the vat, submerged under a top surface of the base resin. The build platform may be placed adjacent to and submerged just underneath the top surface when the first layer of a part is formed, and then submerged further into the vat as subsequent layers are formed on the first layer. In step 630, a photoinitiator solution is dispensed on the top surface of the base resin, the photoinitiator solution being dispensed in a shape area according to a part to be created. The photoinitiator solution has a second viscosity that is less than the first viscosity of the base resin. Step 640 involves illuminating the top surface to expose the photoinitiator solution and base resin to light having a polymerization wavelength, where the light causes polymerization only where the photoinitiator solution was dispensed. After illuminating the top surface of the base resin to the light, step 650 may involve moving the build platform down into the base resin and repeating the dispensing step 630 and the illuminating step 640 to create another layer of the part.

For the flowchart 600, in some embodiments, a difference between the first viscosity and the second viscosity may be at least 10 cP. In some embodiments, the dispensing in step 630 may include varying a concentration of the photoinitiator solution in different portions of the shape area to vary a property within the part, where the concentration may be varied by varying a density of droplets per area or a dispensed droplet size of the photoinitiator. In some embodiments, the dispensing may include jetting. In some embodiments, the dispensing may involve dispensing a material property modifier in at least a portion of the shape area, where the material property modifier may be one or more of a reinforcement agent, a microstructure modifier, a heat stabilizer, an aging stabilizer, and a fiber. In some embodiments, the dispensing involves adjusting the second viscosity of the photoinitiator solution in different portions of the shape area. In some embodiments, the methods further include adjusting a time between the dispensing step 630 and illuminating step 640 in different portions of the shape area.

While the disclosure above describes depositing a photoinitiator onto a resin base material that lacks photoinitiator, embodiments also include combining other types of materials such as different combinations of polymerization reactants and additives, which shall be described below in this disclosure. Embodiments and benefits of the base resin and photoinitiator systems described above apply also to other combinations of vat materials and dispensed materials described throughout this disclosure. For example, dispensing a substance onto a vat-based material enables build areas to be increased in size while still achieving high resolutions and print speeds. High resolutions in X-Y as well as Z-directions can be achieved using dispensing methods such as inkjet technologies. Having polymerization occur at the top surface of the vat enables a wide range of vat materials to be used, since the vat material does not have to transmit the polymerization wavelength. Separating polymerization components from each other—in the dispensed and/or vat material—can increase shelf life of the component materials. Thermal issues can also be mitigated by embodiments of the present disclosure. Another advantage of dispensing a material onto a vat material is that properties can be varied within the produced part by varying dispensing parameters within a layer. Reaction variables of the dispensed materials and vat material may be customized to achieve desired reaction kinetics, properties of the produced part, and degree of curing in the part. Viscosity differences between the first composition (vat material) and the second composition (dispensed material) may be at least 10 cP, such as more than 100 cP or more than 1000 cP or more than 2000 cP.

Figure 7A:
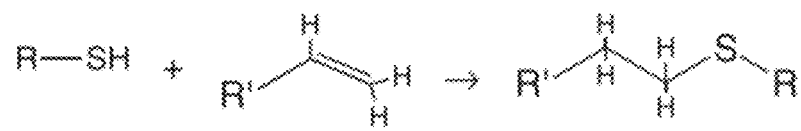
FIGS. 7A-7B show chemical equations for thiol-ene reactions, as known in the art.
Figure 7B:
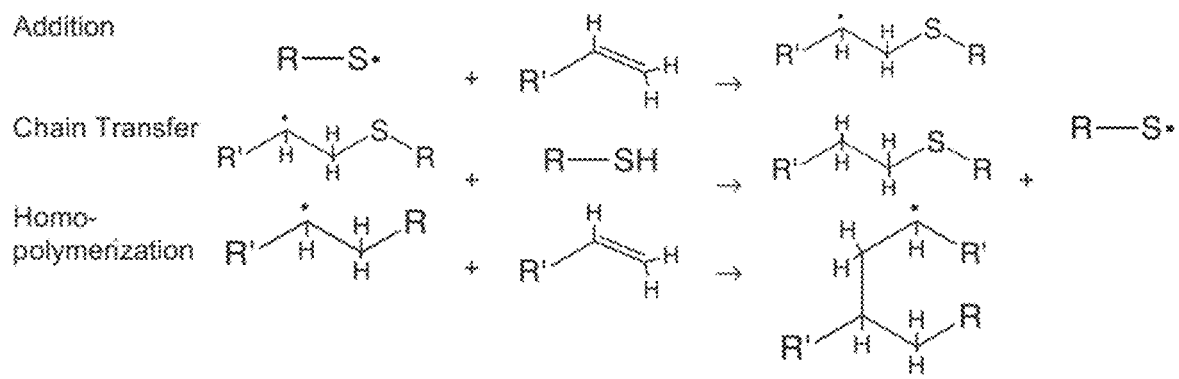

An embodiment of utilizing combinations of other types of polymerization materials is for facilitating thiol-ene chemistry in a vat-type polymerization vessel. FIGS. 7A-7B describe known thiol-ene chemistry in which thiol-ene polymers are formed by the reaction of -enes (e.g., (meth)acrylate) with thiols. In FIG. 7A, a thiol is combined with an ene double bond to result in an addition product. The scheme of FIG. 7B shows the propagation and chain transfer reactions in thiol-ene polymerization. In the addition step, thiyl radicals add across an ene functional group via an addition reaction that generates a carbon radical. In chain transfer, carbon radicals abstract hydrogen from a thiol functional group forming the anti-Markovnikov addition product and a thiyl radical. In homo-polymerization, carbon radicals add across an ene functional group via an addition reaction that generates another carbon-centered radical. These reactions can be initiated by common photoinitiators used in the trade of UV cure, such as 3D printing via the photopolymerization of "ene," such as a (meth)acrylate.

Conventional thiol-ene monomer systems polymerize extremely rapidly and also exhibit minimal inhibition by oxygen and other traditional stabilizers. As such, thiol-ene systems can be rapidly polymerized with little to no inhibition period to form tack-free surfaces with low concentrations of photoinitiator and low irradiation intensities. While this feature is ideal in formulating ultra-fast and energy efficient systems, a drawback is that thiol-ene mixtures may exhibit poor shelf stability at room temperature. Unstabilized shelf lives of thiol-ene systems can be as short as a few hours with the some rapidly polymerizing thiol-ene systems. Thus, thiol-ene chemistry in additive manufacturing systems is not known to be practiced commercially for this reason.

However, embodiments of the present disclosure beneficially provide a way to independently add thiol to ene, or ene to thiol (or to other components) by a reliable delivery system such as an inkjet (e.g., scanning/raster or page-array) or similar delivery system. Each material component of the full additive manufacturing material (e.g., thiols, enes, initiators, inhibitors) can be delivered as required in prescribed locations, timings, concentrations and compositions. In some embodiments, three reactants (thiol, ene, initiators) and one or more diluents are utilized to dissolve and/or adjust the concentration of thiols and initiators. The diluents can be solvents or one of the ene components.

In a first example, thiol and initiator are put in one dispensing unit as the second composition (140, 240, 440 of FIGS. 1, 2, 4A-4B), with an ene in the vat as the first composition (115, 215, 315, 415 of FIGS. 1, 2, 3, 4A-4B). Reaction variables of polymerization, such as the diffusion rate of the reactants, the size and concentration of the drops (as described in relation to FIG. 5B), and the time allowed for the diffusion of the reactants (i.e., elapsed time between dispensing and curing) may be customized to achieve desired properties of the part being printed, such as a desired print resolution. In a second example, thiol is put in a first dispensing unit and the initiator is put in another dispensing unit, and thiol and initiator are dropped sequentially onto ene in the vat. That is, the ene, in this second example is the first composition (115, 215, 315, 415 of FIGS. 1, 2, 3, 4A-4B) and the thiol and initiator are second and third compositions (140, 240, 440 of FIGS. 1, 2, 4A-4B) that are dispensed. In this case, the size of the droplets (and thus the resulting voxels) may be set depending on the diffusion rate of the reactants, as well as the time elapsed between the thiol drops and the initiator drops. The ene may have a higher viscosity than the thiol and initiator in these two examples. That is, the vat material may have a higher viscosity than the dispensed material, as explained in relation to the photoinitiator and resin base material embodiments described above in this disclosure. In a third, more general example, the size of the voxels may be customized depending on the requirement of the end product. For a product requiring high resolution, the size and shape of the dispensed droplets can be tuned to the required resolution. For example, a 1.5 picoliter drop is estimated to produce a 2 $\mu m^3$ voxel. Furthermore, embodiments enable high resolution to be achieved consistently and at high production speeds in the entire layer across the vat surface. In contrast, conventional projection-based systems can have high resolutions but focused on very small vat surface areas. Conventional lasers (e.g., for SLA) can have spot sizes of approximately 25 $\mu m$ but would require very lengthy print times to achieve the same levels of resolution across an entire layer that can be achieved by embodiments of the present disclosure.

Viscosities of the thiol-ene system components can be tailored according to the processing steps utilized, or to meet specifications of the finished product, or to address resolution and thermal issues in various embodiments. In general, the ene component has a higher viscosity than thiol because it contains monomers and oligomers. In one example, an ene+initiator component may be kept stable by storing it in the dark (as in conventional practice of photopolymerization materials), and this component's viscosity can be modulated by choices of ene formulation (where zero ene concentration means just initiator alone). In another example, the viscosity of a thiol+initiator component can be modulated by choice of thiol viscosity and solvent.

Further component mixtures for the vat material and dispensed material may be utilized, other than thiol/ene and photoinitiator-less/photoinitiator combinations. A majority of commercial light cure resins are based on free radical curing acrylic compounds (acrylates), and thus acrylic-based compositions may be utilized in some embodiments, UV curable resins typically contain oligomers, monomers, photoinitiator, and various additives such as stabilizers, antioxidants, plasticizers, and pigments. Any of these resin components may be utilized in various combinations as the vat material and dispensed material(s). Examples of oligomers that may be used in the present disclosure include aliphatic urethane diacrylate (e.g., EBECRYL® 4833) and hexafunctional aliphatic urethane acrylate (e.g., EBECRYL 5129), Examples of monomers that may be used in the present disclosure include aliphatic monofunctional diluting acrylate (e.g., EBECRYL 113), isobornyl acrylate, and dipropylene glycol diacrylate. In an example embodiment, the resin component or the sustaining fluid in the vat (i.e., first composition) may have a density of organic material of approximately. 0.95 to 1.20 g/cc. Combinations of these resin components (and additives as shall be described subsequently) may be utilized as the first composition for the vat material and as the second composition for the dispensed material similarly to the embodiments described throughout this disclosure for thiol-ene and photoinitiator-less resin/photoinitiator systems.

The viscosity of either the first composition in the vat or the dispensed second composition may be modified or customized to influence the print process and final printed part. For example, the viscosity of the material in the vat may be customized to optimize both printability and desired product properties. The vat material may be formulated by judiciously choosing a combination of all components to adjust the viscosity of the mixture in the vat. One example of tailoring the viscosity of the vat material without the use of any additive (e.g., a thickener) is by considering the viscosities of individual components in the resin mix and combining the components in appropriate proportions to result in an overall viscosity of the composition. For instance, a first component with a viscosity $\mu 1$ could be combined in a particular proportion with a second component of viscosity $\mu 2$ to result in a mixture that has a viscosity $\mu 3$ that is between $\mu 1$ and $\mu 2$. Another example of adjusting the viscosity of the vat material is through interaction of special structures, such as hydrogen bonding and chelating. For instance, it is known that substances that have more hydrogen bonds, or that are capable of forming hydrogen bonds, tend to be more viscous than those that do not. Studies in the industry have also shown that cations chelation or the presence of NaCl can increase the viscosity of a substance.

Another embodiment involving viscosity may include dispensing a viscosity modifier throughout the layer being printed or at selected locations, where the dispensing can vary (e.g., in drop size and/or concentration as described in relation to FIG. 5B) within the dispensing pass. Because the dispensed material has low diffusion into the vat material, the properties created in the printed layer due to the varying viscosity can beneficially be customized in that specific print layer. Yet another embodiment may include modifying the dispensed material to be more viscous at the outer perimeter of the dispensed area. This outer perimeter of more viscous material may help limit the amount of dispersion of the photoinitiator or other dispensed component and may result in a more accurate surface finish of the additively manufactured part.

In further embodiments of vat material and dispensed materials, the material in the vat may be an inert medium in relation to polymerization reactions, being a medium such as water, glycerin, or a gel. The polymerization components are then dispensed (as second composition 140, 240, 440 of FIGS. 1, 2, 4A-4B) onto the inert medium (first composition 115, 215, 315, 415 of FIGS. 1, 2, 3, 4A-4B). That is, the vat does not have to contain reactant, it can be a non-solid medium to support the reactants. Using a thiol-ene system as an example, a minting sequence can be to drop (dispense) ene, then drop thiol, then drop the initiator on top of each other in a vat to create the thiol-ene-initiator polymerization, where the vat contains an inert medium such as water, glycerin, hydrocarbon oil, silicone oil or other. Attachment of the polymerized layer to the build platform may be facilitated in some embodiments by, for example, doping the platform with a photoinitiator or other polymerization reactant, or providing a surface treatment on the build platform. The formulations in different areas or voxels of the part's shape can be adjusted to achieve desired part properties such as a required print resolution as described herein, or to create unique 2D or 3D microstructures, as shall be described in further detail below.

Embodiments may include injecting inhibitor material onto surrounding pattern areas of the part to be printed to prevent or control "X-Y Bleed," which is diffusion and/or spreading of reactants within a layer of the printed part. This deposition of an inhibition material can be advantageous from an accuracy perspective. Typically, if a part continues to cure (e.g., beyond the time of light exposure), X-Y growth occurs, causing accuracy issues. By depositing a photoinhibitor at the border of a shape area, the X-Y growth may be controlled by inhibiting cure beyond a certain boundary for optimal accuracy. A photoinhibitor may also be used to control cure-through (Z-direction) by depositing a layer of inhibitor on the surface of the vat material (which will become the down-facing surface of the subsequently-formed layer) before jetting the other components. This deposition can be done during the print layer, or after the cure before the components of the next layer are deposited, for example during a recoating process.

Other embodiments may involve an inverse arrangement of the above embodiments. In these embodiments, a conventional resin is in the vat (including all the polymerization components such as photoinitiator), and then a pigment is injected (dispensed) on the surface of the resin material to block the curing polymerization light. Alternatively, a photoinhibitor may be dispensed on the surface of the resin material to prevent curing where the photoinhibitor is present. The pigment or photoinhibitor is dispensed onto areas surrounding the shape of the part to be printed, rather than in the shape areas to be printed. When the surface of the resin material is exposed to light (e.g., UV light such as by scanning or a blanket exposure), the portions without the pigment or photoinhibitor are cured into a layer of the additive manufactured part, while the pigment-coated or photoinhibitor-coated regions remain uncured. After the printed layer is cured, the build platform is moved down in a layer move or dip move (distance greater than a layer thickness), which results in the pigment or photoinhibitor being mixed into the general vat material. The next layer can then be formed, where a fresh coating of pigment or photoinhibitor is dispensed onto areas surrounding the part shape of the next layer.

Figure 8A:
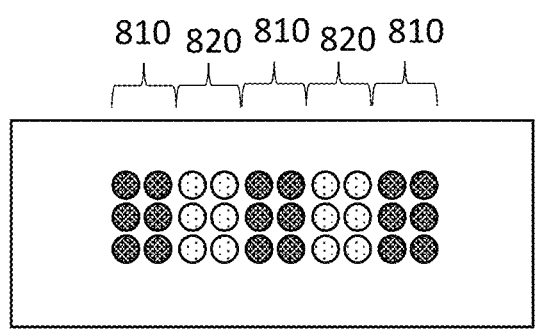
FIGS. 8A-8B illustrate dispensing of a photoinitiator and a polymerization blocking material at locations in a layer, in accordance with some embodiments.
Figure 8B:
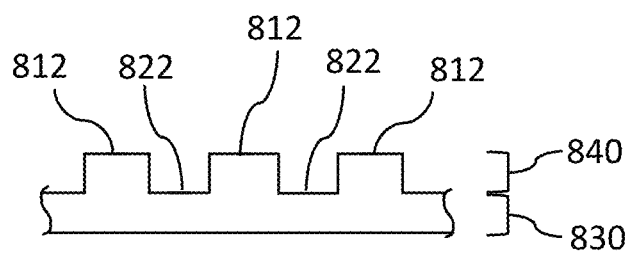

In some embodiments, a polymerization blocking material (e.g., pigment or photoinhibitor) and a photoinitiator can be dispensed at different locations in the same layer of the part to be created. As illustrated in the plan view of FIG. 8A of a top surface of a vat, photoinitiator 810 (dark circles representing droplets) and pigment/inhibitor 820 (light circles representing droplets) can be jetted in selected locations. The side cross-sectional view in FIG. 8B of a printed layer 840 depicts the layer 840 after curing, in which peaks 812 are formed where photoinitiator 810 was deposited and valleys 822 are formed where pigment/photoinhibitor 820 was deposited. That is, polymerization occurs where the photoinitiator 810 was present, and polymerization is prevented where the pigment/inhibitor 820 was present. The preceding printed layer 830 is also shown, which in this embodiment is solid across the region on which the photoinitiator 810 and pigment/inhibitor 820 drops were dispensed. The peaks 812 and valleys 822 create a textured surface similar to a hook-and-loop fastener material, which can improve adhesion to the next layer of the printed part that will be formed on layer 840. In further embodiments, the photoinitiator 810 and pigment/inhibitor 820 can be dispensed in selected locations of a layer to create features such as voids within the part and textures on outer surfaces of the printed part.

Some embodiments include dispensing additives in addition to the reactant components that are needed to create the 3D printed part. For example, pigment, dyes, or other colorants may be deposited onto the surface to create color objects. Examples of pigments include carbon black, silicon dioxide, titanium dioxide and zirconium dioxide. Other embodiments of additives include material property modifiers such as organic or inorganic reinforcement agents (e.g., fibers), microstructure modifiers, and heat and/or aging stabilizers for the finished parts. These additives may be deposited simultaneously with a reactant (e.g., mixed with the reactant material) or subsequently (e.g., with a second printing head). Microstructure modifiers may use the kinetic and/or thermodynamic nature of modifier substances to create microstructures. In one embodiment, a modifier which will slowly react, dissolve or deform prior to the photoreactivity fixation of the system may be used to form a distinct microstructure in the body of the cured formation. For example, glycerol does not dissolve well in acrylic resin and can be used as a microstructure modifier by causing partial or no curing where the glycerol is present. In another embodiment, a modifier which thermodynamically interacts with the structure of the resin, such as by hydrogen-bonding, van der Wools forces, or structure conformation will form a distinct microstructure in the body of the formation by modifying the mechanical properties of the part in that location. For example, a hydrophobic polymer can be injected (dispensed as the second composition) into a hydrophilic resin (first composition in the vat), resulting in a thermodynamic force that will make the hydrophobic part (e.g., glycerol) curl up, thus creating a microstructure.

Figure 9A:
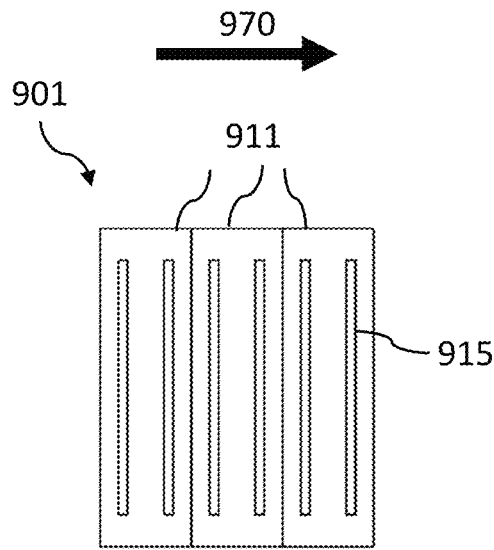
FIGS. 9A-9C show examples of dispensing heads, in accordance with some embodiments.
Figure 9B:
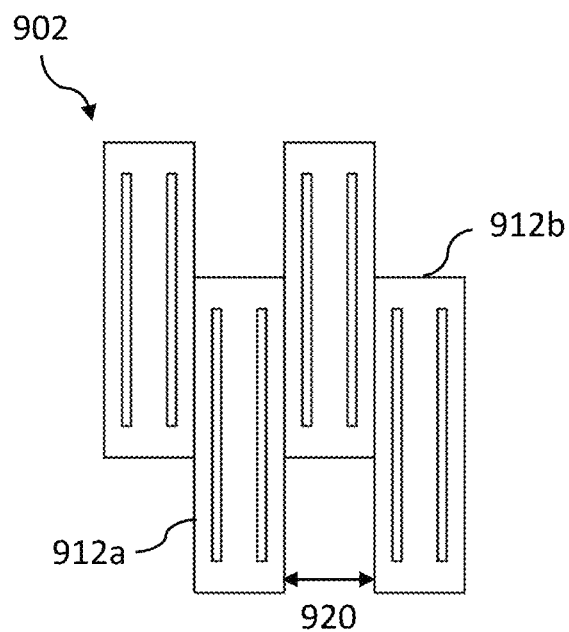
Figure 9C:
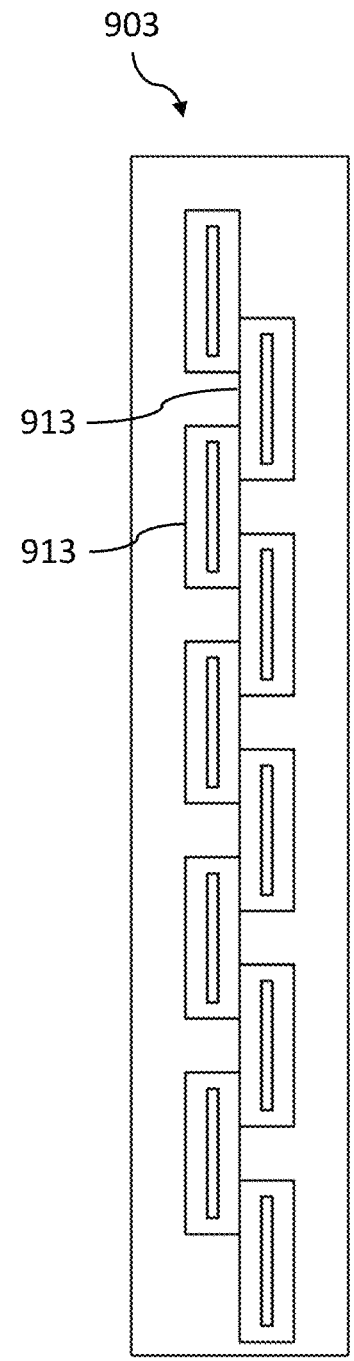

For dispensing multiple materials, such as reactants and/or additives, embodiments may include multiple printheads. FIGS. 9A-9C are plan views of example dispensers with multiple printheads, where the dispensers may be, for example, inkjet or piezo-based jetting type, syringe/pump-type, or other. The print direction is indicated by arrow 970. These embodiments are illustrated as multiple printheads that move together in a single dispenser, such as to provide a larger area of dispensing coverage to reduce print times. Embodiments also include providing these printheads in separate dispensing heads that can move independently from each other, such as for customizing the timing between when different materials are dispensed. Other configurations of printheads as known in, for example, 2D paper inkjetting may also be utilized in embodiments of the present disclosure.

FIG. 9A shows a dispenser 901 for a raster scanning system (e.g., dispensing head 120 of FIG. 1), in which each printhead 911 has two linear arrays 915 of nozzles. Each printhead 911 may dispense a different material from each other. The three printheads 911 of FIG. 9A are configured in an in-line array. That is, there is no offset between the printheads 911, such that the printheads 911 print on the same location as the dispenser 901 moves. FIG. 9B shows a printhead 902 for a raster scanning system, in which four printheads are configured in a staggered array. The printheads 912a and 912b are offset by a dots-per-inch (dpi) amount 920 in the direction that the printheads will be moved. With an offset being present, the offset and moving speed of the printheads determines a time between the materials being deposited onto the vat material (e.g., time between materials dispensed from printhead 912a and printhead 912b). This elapsed time between dispensing materials can be used to customize reaction kinetics of the polymerization, which can be used to customize properties of the produced part such as voxel size. FIG. 9C shows a dispenser 903 for a page-wide system (e.g., dispensers 220 and 320 of FIGS. 2 and 3), where the printheads 913 are in a staggered array. The page-wide configuration of FIG. 9C can be used to increase additive manufacturing production rates by dispensing material over a large area at once. In embodiments, a substrate (build platform) has a first reactant (vat material) covering the substrate, then additional reactants are dispensed by the printheads of FIG. 9A, 9B or 9C (or other configurations of printheads) at desired locations on the build platform. The reactants need not be dispensed at all locations. For instance, if two additives are in the printheads, both additives may be dispensed at some locations, while at other locations one or no additive may be dispensed.

FIGS. 10A-10H illustrate embodiments that include further configurations of dispensing heads and illumination sources to enable customization of properties and characteristics of a printed part. The illumination sources may also be referred to as light sources, curing sources or curing heads. The illumination sources may be any light source that produces wavelengths of light for curing photoreactive polymer materials. Examples of illumination sources include UV light-emitting diode (LED) systems, UV flood lamps, mercury vapor UV bulbs, UV fluorescent bulbs, and projection-based systems. A raster-type scanning apparatus refers to a mechanism that moves side-to-side in one row and then repeats this action in subsequent rows, resulting a back-and-forth X-Y movement. A page-wide scanning apparatus refers to a mechanism that has a width in one dimension (e.g., X-direction) that covers an entire width of a layer to be printed (e.g., up to the entire width of a vat surface), and then moves in the orthogonal direction (e.g., Y-direction). Scanning speeds of the dispensing heads and illumination sources may be, for example, 5 inches per seconds (ips) to 10 ips, or 10 ips to 40 ips, or 1 ips to 60 ips. A blanket apparatus shall refer to a stationary mechanism that covers the entire area of the layer to be printed, such as up to the entire top surface of the vat. Other combinations of the printheads besides those shown in FIGS. 10A-10H are also included in the scope of this disclosure.

Figure 10A:
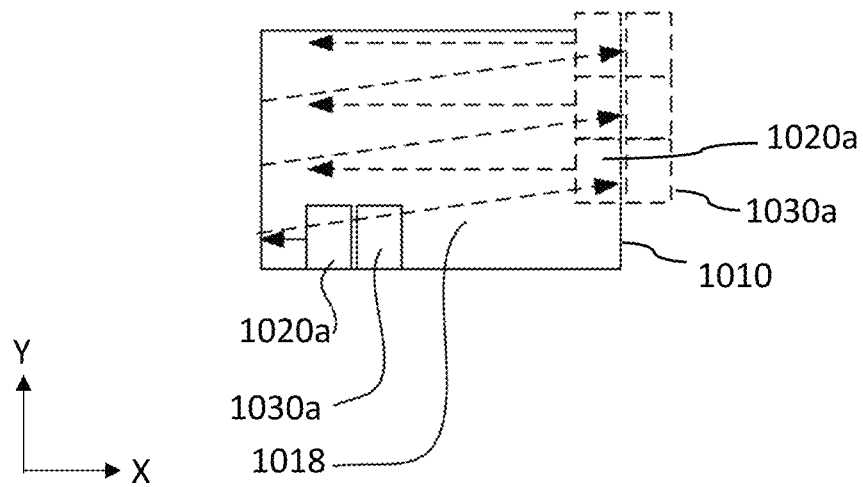
FIGS. 10A-10H are diagrams of various configurations of dispensing heads and illumination sources, in accordance with some embodiments.
Figure 10B:
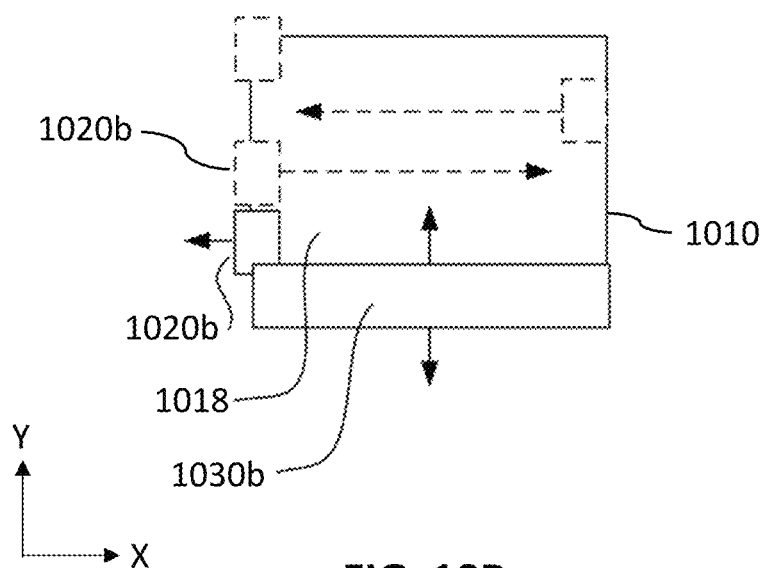
Figure 10C:
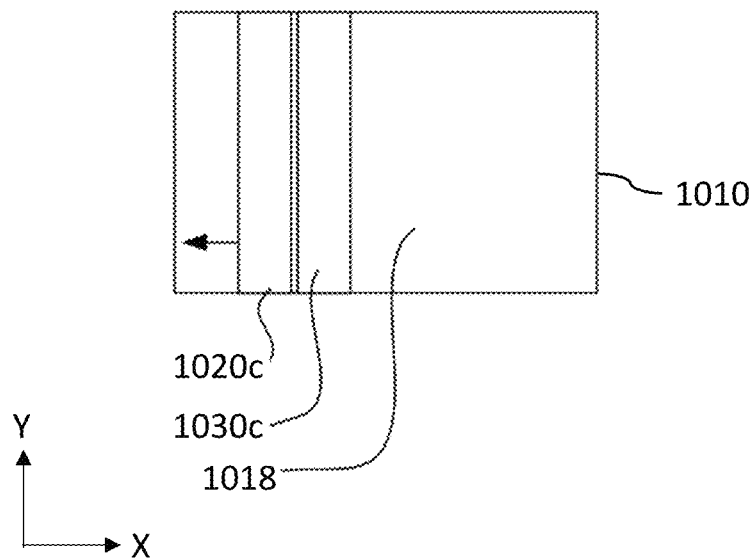
Figure 10D:
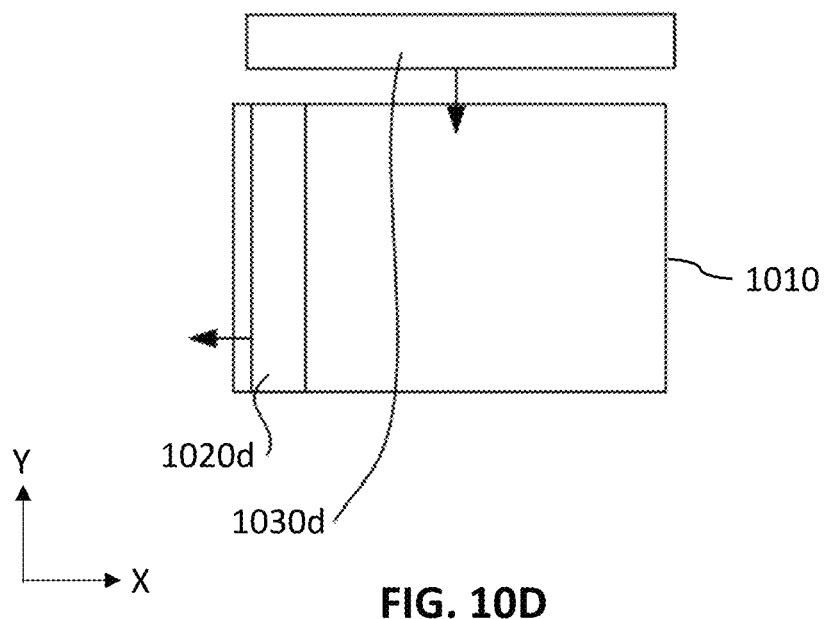

FIGS. 10A-10D demonstrate embodiments in which dispensing heads and illumination sources can be on the same or different axes as each other, or combinations thereof. FIG. 10A is a plan view of a top surface 1018 of a vat 1010, with a raster-type scanning dispensing head 1020a and a raster-type scanning light source 1030a moving on the same axis. In this embodiment, the light source 1030a follows the dispensing head 1020a, where both move in a row in the X-direction and then proceed to the next row to move again in the X-direction (movements indicated by the arrows). This raster pattern continues until the dispensing head 1020a and light source 1030a have passed over the entire area of vat surface 1018 to be printed. In FIG. 10A the dispensing head 1020a and light source 1030a move from right to left in each row, but other embodiments can include moving from left to right in each row, or alternating right-left in one row and left-right in the next row (where the dispensing head 1020a precedes the light source 1030a in each row). FIG. 109 is a plan view showing a raster-type scanning dispensing head 1020b and a page-wide scanning light source 1030b that are on different axes from each other. Dispensing head 1020b moves along a row in the X-direction and then proceeds to the next row to move in the opposite X-direction. The light source 1030b covers a width of the area to be cured, such as the full width of the vat surface 1018 in the X-direction in this embodiment, and thus only moves in Y-direction. FIG. 10C is a plan view showing a page-wide dispensing head 1020c and a page-wide light source 1030c that both move along the same axis, being the X-axis in this embodiment. Only one pass across the vat surface 1018 is needed for both the dispensing head 1020c and the light source 1030c since the entire width in the Y-direction is covered by each apparatus. FIG. 10D is a plan view showing a page-wide dispensing head 1020d and a page-wide light source 1030d that move along different axes from each other. The dispensing head 1020d moves along the X-axis while the page-wide light source 1030d moves along the Y-axis.

Figure 10E:
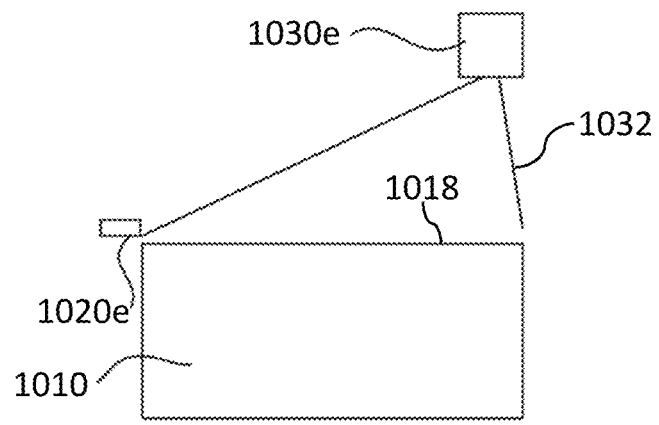
Figure 10F:
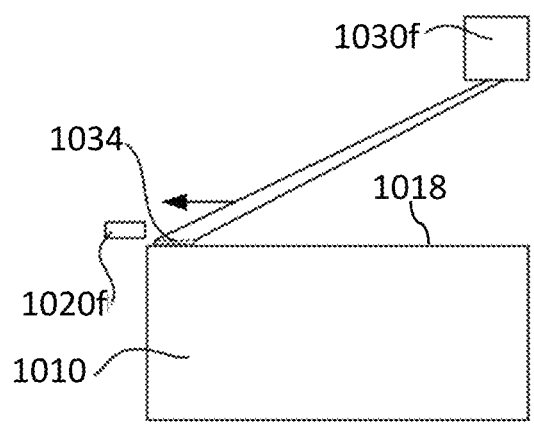

FIGS. 10E-10H demonstrate embodiments in which a stationary blanket illumination source or projection-based illumination source projects shapes or blanket images onto the layer being printed. The blanket illumination source or projection-based illumination source can be combined with a scanning raster-type dispensing head, a scanning page-wide dispensing head, or combinations thereof. FIG. 10E is a side view of a scanning dispensing head 1020e (which can be raster-type or page-wide) used with a stationary blanket curing illumination source 1030e. Illumination source 1030e can be, for example, an array or matrix of LEDs, or one or more UV flood lamps. Light 1032 emitted from illumination source 1030e covers an entire shape area of the part layer to be printed, such as up to the entire area of top surface 1018 of the vat 1010. FIG. 10F is a side view of a scanning dispensing head 1020f (which can be raster-type or page-wide) used with a projector 1030f. Projector 1030f serves as a projection-based curing illumination source that projects an image shape 1034. The image shape may be, for example, a bar, a line, or other shape that covers a portion of the print layer rather than the entire print area. As the dispensing head 1020f moves over the vat surface 1018, the projector 1030f causes the projected image 1034 to also move, following the dispensing head 1020f. In one example where the dispensing head 1020f is raster-type, the image 1034 may be a square or circle that has a similar area or width (in the direction perpendicular to the direction of scanning) as the dispensing head 1020f. In another example where the dispensing head 1020f is page-wide, the image 1034 may be a bar or line that is at least as wide as the dispensing head 1020f.

Figure 10G:
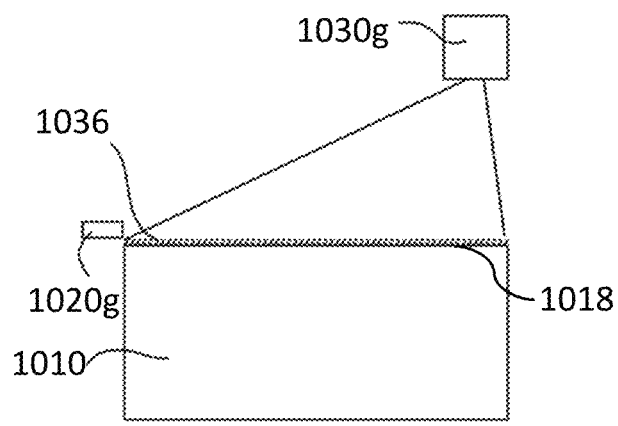
Figure 10H:
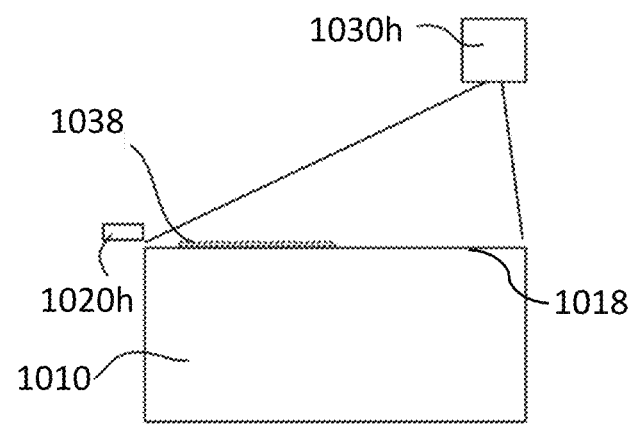

FIG. 10G is a side view of a scanning dispensing head 1020g (raster-type or page-wide) used with a projector-based illumination source 1030g that projects a full image 1036 covering the entire layer bring printed on the top surface 1018 of the vat 1010. In some embodiments, the projected image 1036 may have the polymerization wavelength across the entire surface, where curing on the surface occurs selectively (in the desired shape areas only) due to the reactions of the dispensed and vat materials (e.g., where photoinitiator is present with a base resin, or where all polymer reactants are present). In other embodiments, the image 1036 has the polymerization wavelength in the shape area to be printed, and non-polymerization wavelengths outside of the shape area. FIG. 10H is a side view of a scanning dispensing head 1020h (raster-type or page-wide) used with a projector-based illumination source 1030h that projects an image 1038 covering only the area of intended cure. The image 1038 has the polymerization wavelength and is a cross-sectional "slice" of the part to be printed. Thus, as layers are formed in the vat 1010, the image 1038 changes according to the shape of the particular layer being printed. The embodiments of FIGS. 10G-10H may help to control X-Y bleed by reducing the dependency of the timing between jetting and curing, since the top surface 1018 of the vat material is exposed to polymerization light only where the layer shape is intended to be formed.

In summary, FIGS. 10A-10H describe embodiments in which various combinations of scanning raster-type dispensing heads, scanning page-wide dispensing heads, scanning raster-type curing heads, scanning page-wide curing heads, stationary blanket curing heads, projection-based illumination sources that project light in shapes that move over the surface, and projection-based illumination sources that project stationary images may be used. In addition to affecting printing speed and controlling X-Y bleed, the various dispensing head and illumination source configurations may also be used to adjust the elapsed time between the dispensing (e.g., jetting) and curing (exposure of light on a particular region). The mechanical configurations of dispensing and illumination apparatuses of FIGS. 10A-G (as well as FIGS. 1-3) have a direct impact on the duration of exposure necessary to achieve a necessary energy to cause polymerization for a layer. A desired amount of light exposure to cause polymerization may range from, for example, approximately 5 mJ/cm$^2$ to 20 mJ/cm$^2$ for a layer thickness of 30 µm to 100 µm, such as 10 mJ/cm$^2$ to 20 mJ/cm$^2$ for a layer thickness of 50 µm to 100 µm. The timing between dispensing and curing is dependent on the mechanical configurations of the dispensing and curing apparatuses, the spacing from the dispensing jet nozzles to the top surface of the vat, and the speed of jetted drops (e.g., approximately 5 m/s to approximately 20 m/s). The timing between dispensing and curing is also dependent on the dispensing head scan speed, which can range from, for example, 5 ips to 60 ips if using speeds per 2D printing technologies. All of these factors may be customized in accordance with the present disclosure to achieve desired reaction kinetics between the dispensed materials and vat materials.

Timing and curing power dependencies between i) the illumination source configuration and ii) the distance between the illumination source and top surface of the vat material may also be utilized to customize properties and characteristics of the produced part. The illumination source configuration includes the power of the curing source. Embodiments may aim to keep a constant amount of time delay between jetting and curing over the entire vat surface. In one example involving a scanning page-wide dispensing head and a scanning page-wide illumination source (e.g., light bar) that move along the same axis (e.g., FIG. 10C), a constant time delay between dispensing and curing may be achieved by setting the moving speed of the illumination source to be equal to the dispensing head speed. The power level of the illumination source is then modulated to achieve a desired exposure range. In a second example, a page-wide dispensing head is used with projected light in the shape of a bar that chases the dispensing head (e.g., FIG. 10F). In this second example, the cure scanning speed is set equal to the dispensing bar speed, and power is modulated to achieve a desired exposure range. The width of the projected light bar (width perpendicular to the length of the page-wide bar) is also a variable that drives the power setting in order to maintain the constant time delay between dispensing and curing. This second example may also apply to projecting sliced image data, such as in FIG. 10H, where the projected light bar represents sequential linear strips of the sliced image as the light bar moves across the surface.

In a third example involving blanket curing, as in FIG. 10E or 10G, the time delay between dispensing and curing will vary across the surface since certain portions of the vat will receive dispensed materials before other areas. In this example, the X-Y bleed may vary across the printed layer, and diffusion of the dispensed material in the Z-direction (depth into the vat material) may also vary across the layer. However, a trade-off between faster print speeds versus lower accuracy (resolution) or less consistent mechanical attributes across the layer may be acceptable for the part being produced such that the blanket curing is beneficial. In a fourth example, page-wide dispensing with page-wide curing on a different axis as in FIG. 10D will also cause the elapsed time between dispensing and curing to vary across the surface. As with the third example, the benefits of production speed in exchange for an acceptable level of print quality or mechanical attributes may be acceptable. As can be seen by the embodiments of FIGS. 10A-10H, the overall scanning speeds for the dispensing head and illumination source may be customized and determined by the type of curing source used, power emitted by the curing source, how the curing source is configured relative to the dispensing head, and the distance between the dispensing head/light source and surface of the vat material.

Figure 11A:
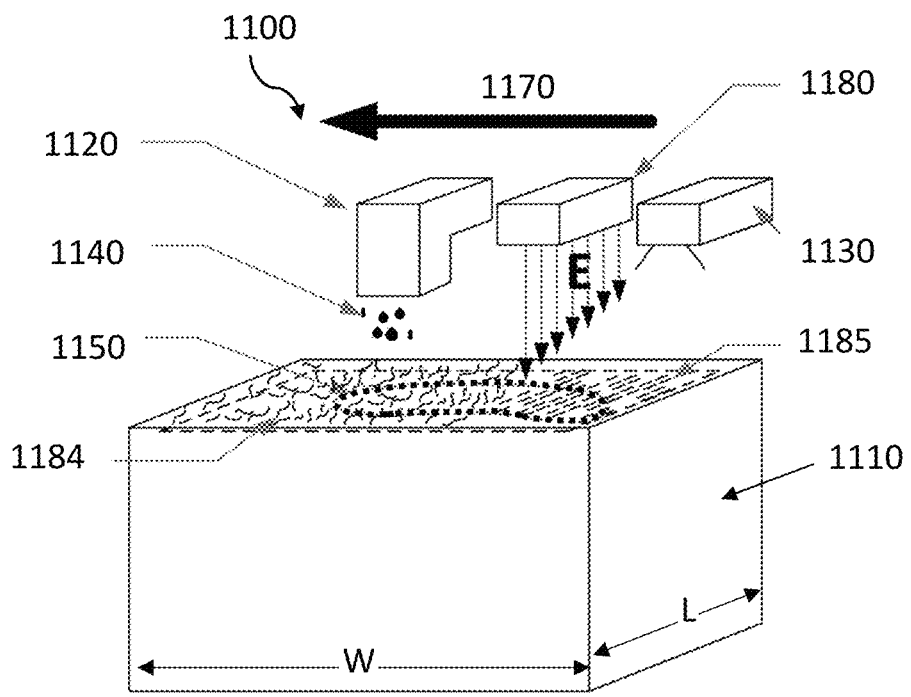
FIGS. 11A-11C are illustrations of additive manufacturing systems that utilize an electric field system, in accordance with some embodiments.
Figure 11B:
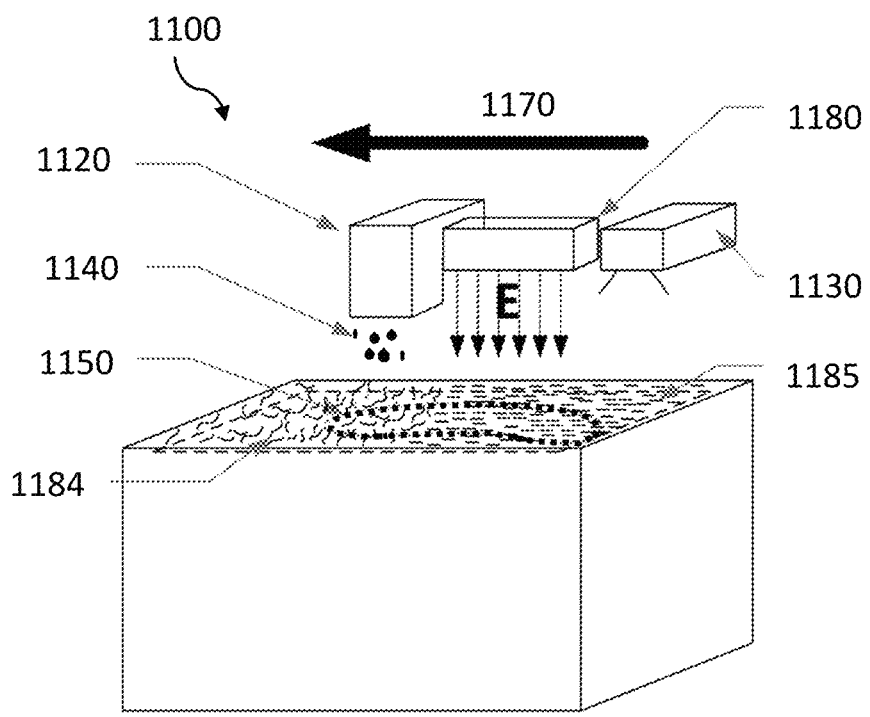

For dispensing fibers (e.g., carbon fibers, glass fibers) as an additive, the size of the fibers can be appropriately sized for the type of delivery system (inkjet nozzle, syringe-type, etc.). In some embodiments, the fibers may be included in the vat material rather than in the dispensed material. In embodiments utilizing fibers, a vat-based/dispensing system for additive manufacturing can be combined with an electric field system to control the orientation of the fibers during print. FIGS. 11A-11B are isometric views of a system 1100 that utilizes electric or magnetic fields. System 1100 includes a vat 1110, a dispensing head 1120, an illumination source 1130, and an electric field apparatus 1180. Dispensing head 1120 may be configured as any dispensing head described herein. Dispensing head 1120 deposits a second composition 1140 on the surface of a first composition in the vat 1110, in shape area 1150. Illumination source 1130 may be configured as any light source disclosed herein. The electric field apparatus 1180 generates an electric field "E" (or magnetic field) in the vicinity of the vat surface, such as being configured as a plate, bar or apparatus of another shape that can be charged with a high voltage. The generated electric field is used to influence the orientation of fibers 1184, 1185 with respect to the vat, where the fibers include an electrically conductive or magnetic material such as carbon (e.g., nanotubes or other allotropes) or metal. In some embodiments, the fibers 1184, 1185 may be made of other types of materials such as glass, polymers, aramid, cellulose, biodegradable materials, bamboo, spider webbing, or black widow webbing, with the fibers being strategically charged electrically or magnetically. Fibers throughout the system (vat material and/or dispensed material) may be charged with opposing polarities from each other or may all be the same polarity.

Figure 11C:
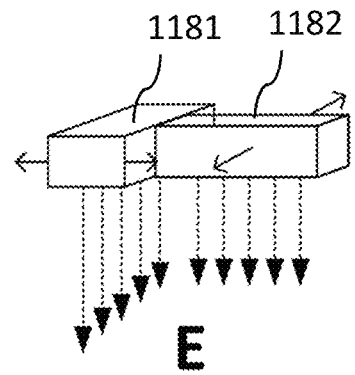

In FIGS. 11A-11B, fibers are illustrated as being a component of the first composition in the vat 1110 but could also be dispensed as part of second composition 1140 in other embodiments. Fibers 1184 are in their natural, disoriented state. In contrast, fibers 1185 are oriented in a particular direction in response to electric field apparatus 1180 passing over (in the print direction represented by arrow 1170) and being activated in certain regions (e.g., all or some of areas of the shape area 1150). Thus, methods include using the electric field apparatus 1180 to change an orientation of fibers to a desired orientation in at least a portion of the part being created. In FIG. 11A, the electric field apparatus 1180 is aligned along the length L of the vat 1110, such that the generated electric field E causes the fibers 1185 to become oriented in the direction of the length L. In FIG. 11B, the electric field apparatus 1180 is aligned along the width W of the vat 1110, such that the generated electric field E causes the fibers 1185 to become oriented in the direction of the width W. FIG. 11C shows an embodiment where more than one electric field apparatus is present. Electric field apparatus 1181 is aligned lengthwise while electric field apparatus 1182 is aligned widthwise, where the apparatuses 1181 and 1182 can be activated and moved at different instances to achieve desired orientations of fibers (e.g., at an angle that is non-orthogonal to L or W). In any of the embodiments of FIGS. 11A-11C, movements of the electric field apparatuses can be linear, rotational, or other directions. The polarity and intensity of the electric field can also be changed as the electric field apparatus moves across the vat, to create varying properties in the layer of the formed part due to varying orientations of the fibers. For example, the charge polarity can change, or the angle and/or orientation of the electric field can change.

Figure 12:
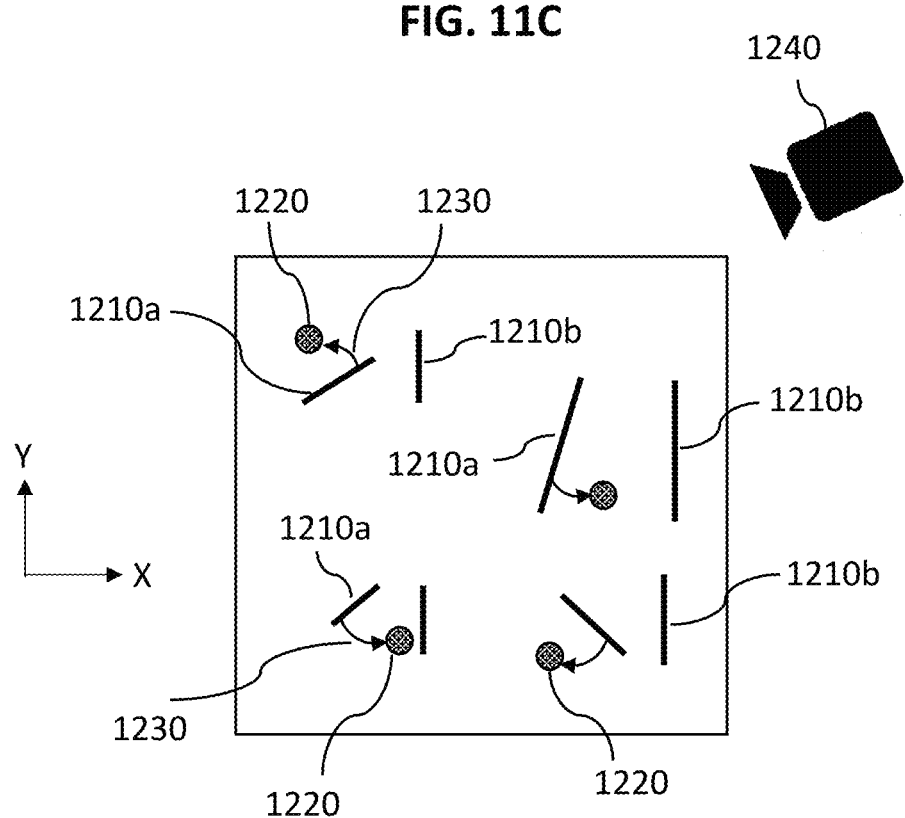
FIG. 12 is a plan view showing the use of dispensed droplets to control an orientation of fibers in a vat, in accordance with some embodiments.

FIG. 12 illustrates an embodiment in which fibers are caused to be oriented in a particular direction using kinetics/kinematics of nearby droplets and/or by the chemical nature of the droplets. Such methods include dispensing droplets to change an orientation of fibers to a desired orientation in at least a portion of the part being created. The dispensing may include tailoring the droplet size, dispensing location in the vat, droplet velocity and/or material being dispensed. FIG. 12 is a plan view of a portion of a top surface of a vat where fibers 1210a, 1210b are illustrated as lines, and dispensed droplets 1220 are illustrated as circles. Fibers 1210a are in their original "disoriented" position, and fibers 1210b are in a desired orientation which is in the Y-direction in this illustration. The droplets 1220 may be used to change the orientation of the fibers 1210 as indicated by arrows 1230, to be aligned with fibers 1210*b*. The arrows 1230 show the fibers 1210*a* being drawn (e.g., rotate) toward the droplets 1220 in this embodiment, but the fibers could also be moved away from the droplets. In one example, the kinetics/kinematics of a dispensed droplet impacting the material in the vat may influence the orientation of a fiber to change in a desired direction relative to the location of droplet impact. That is, the motion of the vat material caused by the droplet falling onto the vat material can be used to modify the angle of a fiber. In another example, the surface tension of a droplet 1220 landing near a disoriented fiber 1210*a* can be used to rotate the fiber toward the droplet, to be aligned with fibers 1210*b*. That is, the presence of dispensed droplets on the vat material changes the surface tension of the surface of the vat material, thus causing the fibers to move. This use of the dispensed material's surface tension property can be employed as a chemical means of influencing the fiber orientation. Embodiments may include a vision capture device such as a camera 1240 to pre-scan an area for disoriented fibers. This scanning information can then be communicated to the dispensing head (e.g., jetting head) so that droplets are dispensed in strategic locations to control the orientation of the fibers in a desired manner.

Embodiments also include customizing properties such as color, flexural modulus, strength (e.g., tensile strength), and/or stability (e.g., thermal, aging) in specific voxels of the printed part by using any of the embodiments described herein.

In some embodiments, properties can be controlled on a molecular scale. For example, by varying the concentration of the photoinitiator or other dispensed substance from one drop to another in different parts of the printed pattern, programmatic control over the number and length of the polymer chains (and consequently degree of cure) in the final part can be achieved. This customization is extremely desirable in 3D printing as it enables voxel-level control over physical properties of the printed part, where voxel-level control can affect overall properties of the part. As an analogy, a single large part behaves differently than a bundle of small parts. In the same manner, voxel-level control of material properties can change the behavior of the overall part, such as in flexural modulus or tensile strength.

Embodiments can also control properties on a micro-scale, such as by controlling the concentration of a reactant via adjusting the size of individual drops of dispensed material and/or adjusting the density of the number of drops in an area. For example, if one region in a layer has a high concentration of reactant while another low, the resulting printed part will be a heterogenous structure instead of a homogenous structure. This can be very advantageous from an advanced material science perspective involving microstructures, such as by enabling the building of tessellated or regular physical patterns at the microscale.

In another example, properties can be controlled on a layer-by-layer scale, producing laminate structures of customized properties. Dispensing materials onto a vat can enable simulating a laminate structure during print, where the structure is comprised of different materials/ingredients to control different mechanical properties. An example application is for individualized dental aligners, which are currently not achievable by 3D printing. Embodiments provide the ability to control properties such as flexural stress relaxation by adjusting the sequence and concentration of dispensed material(s) onto a vat substance during the forming of simulated laminate structures. Flexural stress relaxation is a key mechanical property for the dental aligner use-case that addresses the requirement of having a low force that does not degrade over time under a load. The addressability that is achievable from jetting (or other dispensing method), along with the ability to control concentrations of materials can help create different flexural moduli at different positions during the print of a simulated laminate structure such as a dental aligner.

Macro-scale advantages can also be achieved by the shape and physical properties of the finished part, which can be determined by controlling the overall reactions between the dispensed materials and vat-contained materials.

Embodiments furthermore enable physically challenging components to be delivered and mixed on demand to prescribed reaction sites, Examples of components that are conventionally physically challenging to deliver are materials with very high density (e.g., zirconium oxide or glass beads), which are difficult to disperse uniformly in a reaction medium since they tend to sink. Materials with lower density (e.g., polyethylene, wax, hollow spheres) than the reaction medium are also hard to disperse uniformly since they tend to gather toward an upper region of the reaction medium. These types of components can be deposited at desired locations within a printed part using the present methods and systems. For example, colloidal-type materials may be dispensed at specific regions as described in FIG. 5B, where instead of varying drop size or concentration within a layer, the amount of dispersion particles being deposited may vary from region to region (e.g., no particles in some regions and some particles in other regions). Examples of dispersions of particles in liquids that may be used in various embodiments include ceramic matrices, ceramic slurries, inks with pigments, or minerals. Dental impression compounds are a specific example, which can include high loading of materials such as silicon dioxide or zirconium dioxide in (meth) acrylate resins.

For products requiring special microstructures or high production speed, larger drop sizes can be achieved by using dispensing methods other than small inkjet droplets. For example, a layered structure can be printed by depositing an entire layer of material instead of droplets. In another example, to print materials with a microsphere reinforcement structure, the microsphere material can be interdispersed in the matrix (dispensed) materials and dispensed. Similarly, for printing a part reinforced with short fibers, the fibers can be interdispersed with, and then dispensed with, the matrix materials.

Figure 13:
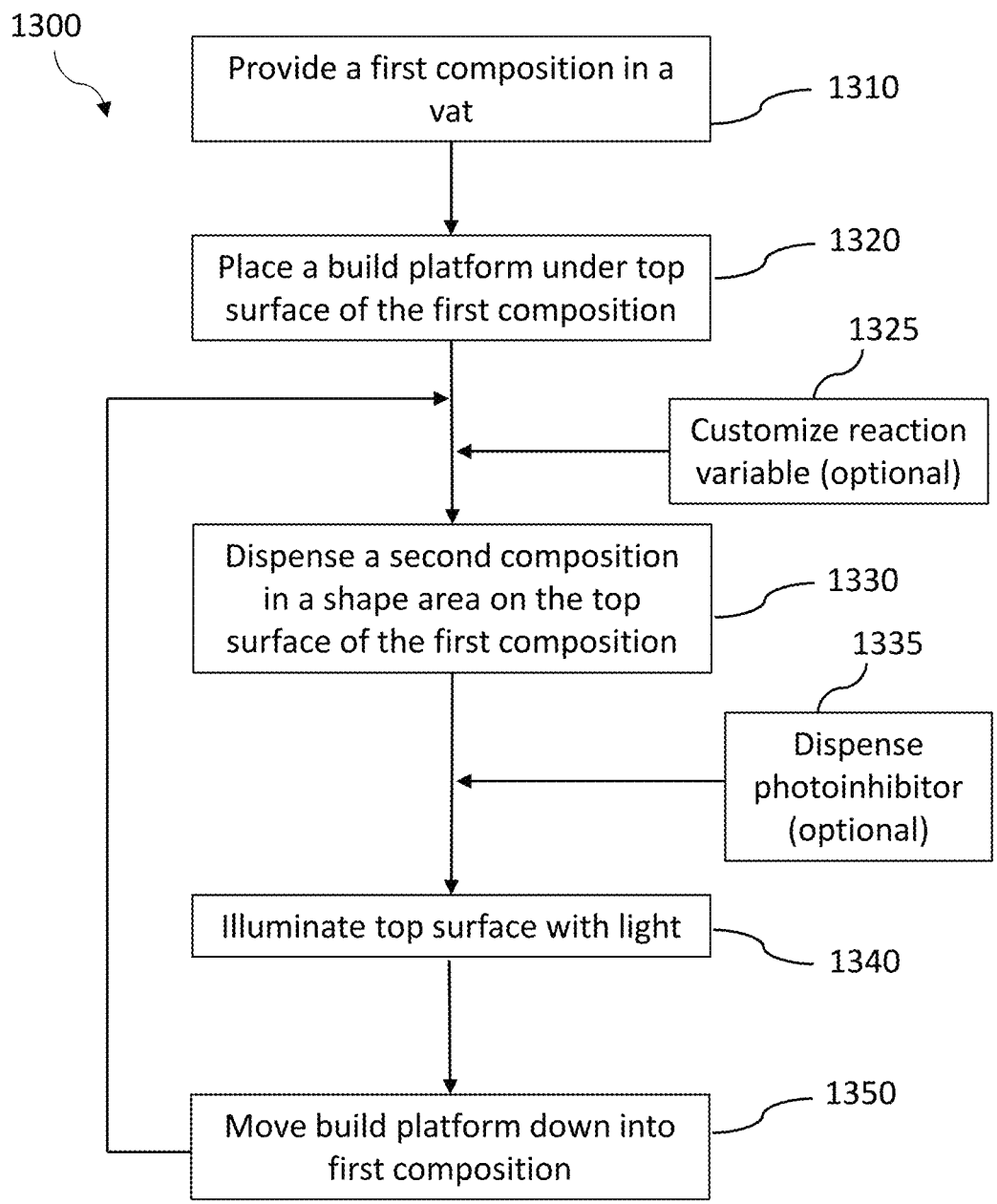
FIG. 13 is a flowchart of further additive manufacturing methods, in accordance with some embodiments.

FIG. 13 is a flowchart 1300 of methods for creating additive manufactured parts in accordance with some embodiments, in which a material is dispensed onto another material that is in a vat. Step 1310 involves providing a first composition in a vat, where the first composition is a liquid with a first viscosity. In step 1320, a build platform is placed in the vat, submerged under a top surface of the first composition. The build platform may be adjacent to and just underneath the top surface (e.g., upper surface of the build platform being 0 to 1000 μm below the top surface) when the first layer of a part is formed, and then submerged deeper into the vat as the following layers are formed on the first layer. In step 1330, a second composition is dispensed on the top surface of the first composition. The second composition has a second viscosity and is dispensed in a shape area according to a part to be created. Step 1340 involves illuminating the top surface to expose the first composition and the second composition to light having a polymerization wavelength, thereby causing polymerization of the first composition and/or second composition (i.e., at least one of the first composition or the second composition). After the illuminating step 1340, step 1350 may involve moving the build platform down into the first composition and repeating the dispensing and the illuminating steps to create another layer of the part.

For the flowchart 1300, in some embodiments the first composition is a base resin absent of a photoinitiator, and the second composition comprises the photoinitiator. In some embodiments, the first composition comprises a thiol or an -ene, and the second composition comprises the -ene or the thiol, respectively. That is, the first composition comprises a thiol and the second composition comprises an -ene, or the first composition comprises an -ene and the second composition comprises a thiol. Other combinations of materials may be used for the first composition and the second composition, such as various polymer reactants for the first composition and the second composition, where additives may be included in the first composition and/or the second composition. Some embodiments may include step 1335 of dispensing a photoinhibitor at a border of the shape area to prevent curing beyond the desired shape area and thus improve dimensional accuracy of the produced part. In some embodiments, the second viscosity of the second composition is less than the first viscosity of the first composition. The dispensing of steps 1330 and 1335 may comprise jetting the second composition from a printhead.

Some embodiments may involve a step 1325 of customizing a reaction variable of the polymerization. For example, a reaction variable of the polymerization may be customized to control a voxel size in the shape area. A reaction variable of the polymerization may be customized according to a desired property of the part to be created, the reaction variable being chosen from the group consisting of: the first viscosity, the second viscosity, a chemical affinity between the first composition and the second composition, and a solubility of the second composition in the first composition. A reaction variable of the polymerization may involve customizing an elapsed time between the dispensing step 1330 and the illuminating step 1340 based on a desired property of the part to be created. Step 1325 may be performed prior to the start of the entire additive manufacturing print run or may be repeated during the print run to update the reaction variables in response to real-time feedback of printing parameters (e.g., vat material temperature, dimensional measurements of the printed layers).

Further embodiments of step 1330 may include varying the second composition in different portions of the shape area (e.g., to alter reaction kinetics), such as by varying the second viscosity or a dispensed droplet velocity of the second composition. In some embodiments, the dispensing of step 1330 comprises varying a concentration of the second composition in different portions of the shape area (e.g., to vary a property within the part), by varying a density of droplets per area or a dispensed droplet size of the second composition. In some embodiments, step 1330 may include dispensing a third composition on the top surface of the first composition in the shape area according to the part to be created, where the first composition is an inert medium for polymerization, and the second composition and the third composition are reactants for the polymerization. In some embodiments of flowchart 1300, the dispensing of step 1330 involves dispensing a material property modifier (e.g., in the second composition or another dispensed composition) in at least a portion of the shape area, where the material property modifier may be a reinforcement agent, a microstructure modifier, a heat stabilizer, an aging stabilizer, or a fiber.

Embodiments of the present disclosure advantageously enable mechanical properties within a part to be controlled based on varying positional gradients of the dispensed materials, providing the ability to create variable mechanical properties within a part. In one example, increasing amounts of photoinitiator can be deposited while progressing from one side of the vat area to the other side over the given geometry shape of the layer part. Such a gradient in the amount of photoinitiator over the layer can modify the mechanical properties by varying the degree of curing across the layer. Other ingredients can be dispensed in a gradient manner as well, such as changing the concentration of a dispensed monomer over the shape area to adjust mechanical properties. In another example, both a monomer and a photoinitiator can be dispensed in varying concentrations as the dispensing head is moved across the vat surface. In various embodiments, the gradient in dispensing the materials may be uni-directional, such as increasing from one side of a layer to the opposite side or decreasing from one side to the other. In other embodiments the gradients may be multi-directional, such as increasing partially across a layer and then decreasing, or varying in two or three dimensions (e.g., X and Y instead of just X or just Y, and/or in the Z direction—see coordinate axes in FIGS. 1 and 2).

Yet further embodiments involve isolating one of the polymerization components within the vat material, such as by encapsulation or an emulsion, where the isolated component is released when exposed to an external influence such as light. In one example using photoinitiator as the isolated component, the photoinitiator is encapsulated in shells that are distributed throughout the base resin. The shells can be selectively broken down with an external influence such as UV light or a chemical that is jetted, thus releasing the photoinitiator and allowing targeted curing. In such an example, methods involve providing a base resin in a vat, where a photoinitiator is in a contained form in the base resin; placing a build platform adjacent to and submerged under a top surface of the base resin; and applying an external influence to the top surface of the base resin. The external influence is applied in a shape area according to a part being created, thereby releasing the photoinitiator from its contained form and, upon exposure to light having a polymerization wavelength, polymerizing the base resin in the shape area where the external influence was applied. The contained form of the photoinitiator may be particles encapsulated by shells. The external influence may involve illuminating with UV light or jetting a chemical.

Other embodiments include creating a product that can be foamed after the part is printed. Conventional foaming schemes have been practiced on coatings on paper and in architectural materials such as wall panels and wall papers. Those coating materials contain chemical foaming agents such as ADCA (azodicarbamide, CAS #123-77-3), OBSH (4,4'-oxybis(benzenesulfonyl hydrazide), CAS #80-51-3) and DPT (N,N-Dinitrosopentamethylenetetramine, CAS #101-25-7). Chemical foaming agents are stable in fully polymerized acrylate coating systems (e.g., paper coating and household paint). However, almost all of the commercial foaming agents destabilize the acrylate monomers and oligomers for UV 3D printing systems. In some embodiments, the shelf stability issue is improved by dispensing the chemical foaming agents onto a vat material, on demand at the right time, at the desired location using the methods and systems described herein.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method of creating additive manufactured parts, the method comprising:
    providing a first composition in a vat, wherein the first composition is a liquid with a first viscosity;
    providing a second composition to be dispensed, the second composition having a second viscosity, wherein polymerization components for formation of a layer of a part to be created are separated from each other, and wherein at least one of the polymerization components is in the first composition or the second composition;
    placing a build platform in the vat, submerged under a top surface of the first composition;
    during formation of the layer of the part, dispensing the second composition on the top surface of the first composition, the second composition being selectively dispensed in a shape area according to a pattern area of the layer of the part to be created; and
    illuminating the top surface to expose the first composition and the second composition to light having a polymerization wavelength, thereby causing polymerization of at least one of the first composition or the second composition only in the shape area where the second composition was dispensed.

2. The method of claim 1 wherein the polymerization components comprise a photoinitiator and a base resin absent of the photoinitiator, and wherein the first composition is the base resin and the second composition comprises the photoinitiator.

3. The method of claim 1 wherein the polymerization components comprise a thiol and an -ene, and wherein the first composition comprises the thiol or the -ene, and the second composition comprises the -ene or the thiol, respectively.

4. The method of claim 1 further comprising dispensing a photoinhibitor at a border of the shape area.

5. The method of claim 1 wherein the second viscosity of the second composition is less than the first viscosity of the first composition.

6. The method of claim 1 wherein the dispensing comprises jetting.

7. The method of claim 1 further comprising customizing a reaction variable of the polymerization to control a voxel size in the shape area.

8. The method of claim 1 further comprising customizing a reaction variable of the polymerization according to a desired property of the part to be created, the reaction variable being chosen from the group consisting of: the first viscosity, the second viscosity, a chemical affinity between the first composition and the second composition, and a solubility of the second composition in the first composition.

9. The method of claim 1 further comprising customizing an elapsed time between the dispensing and the illuminating to customize reaction kinetics of the polymerization based on a desired property of the part to be created.

10. The method of claim 1 wherein the dispensing comprises varying the second composition in different portions of the shape area, wherein the varying comprises varying the second viscosity or a dispensed droplet velocity of the second composition.

11. The method of claim 1 wherein the dispensing comprises varying a concentration of the second composition in different portions of the shape area, by varying a density of droplets per area or a dispensed droplet size of the second composition.

12. The method of claim 1 further comprising dispensing a third composition on the top surface of the first composition, in the shape area;
    wherein the first composition is an inert medium for the polymerization; and
    wherein the polymerization components comprise the second composition and the third composition.

13. The method of claim 1 wherein the dispensing further comprises dispensing a material property modifier in at least a portion of the shape area, wherein the material property modifier is a reinforcement agent, a microstructure modifier, a heat stabilizer, an aging stabilizer, or a fiber.

14. A method of creating additive manufactured parts, the method comprising:
    providing a base resin in a vat, wherein the base resin has a first viscosity and is absent of a photoinitiator;
    placing a build platform in the vat, submerged under a top surface of the base resin;
    during formation of a layer of a part to be created, dispensing a photoinitiator solution on the top surface of the base resin, the photoinitiator solution being selectively dispensed in a shape area according to a pattern area of the layer of the part to be created, wherein the photoinitiator solution has a second viscosity that is less than the first viscosity of the base resin; and
    illuminating the top surface to expose the photoinitiator solution and the base resin to light having a polymerization wavelength, wherein the light causes polymerization only in the shape area where the photoinitiator solution was dispensed.

15. The method of claim 14 further comprising, after illuminating the top surface of the base resin to the light:
    moving the build platform down into the base resin; and
    repeating the dispensing and the illuminating to create another layer of the part.

16. The method of claim 14 wherein a difference between the first viscosity and the second viscosity is at least 10 cP.

17. The method of claim 14 wherein the dispensing comprises varying a concentration of the photoinitiator solution in different portions of the shape area, by varying a density of droplets per area or a dispensed droplet size of the photoinitiator.

18. The method of claim 14 wherein the dispensing comprises jetting.

19. The method of claim 14 wherein the dispensing further comprises dispensing a material property modifier in at least a portion of the shape area, wherein the material property modifier is a reinforcement agent, a microstructure modifier, a heat stabilizer, an aging stabilizer, or a fiber.

20. The method of claim 14 wherein the dispensing comprises adjusting the second viscosity of the photoinitiator solution in different portions of the shape area.

21. The method of claim 14 further comprising adjusting a time between the dispensing and the illuminating steps in different portions of the shape area to customize reaction kinetics of the polymerization.

22. The method of claim 1 wherein the illuminating exposes the entire top surface to the polymerization wavelength.

* * * * *